(12) United States Patent
Long et al.

(10) Patent No.: US 10,102,079 B2
(45) Date of Patent: Oct. 16, 2018

(54) TRIGGERING DISCOVERY POINTS BASED ON CHANGE

(71) Applicant: HYTRUST, INC., Mountain View, CA (US)

(72) Inventors: Paula Long, Amherst, NH (US); Damon Hsu-Hung, Sudbury, MA (US); Eric Sondhi, Tyngsboro, MA (US); Misha Zelikov, Neeham, MA (US); Bryan Keith Panner, Windham, NH (US); Dmitry Bochkov, Derry, NH (US); Andrew Ferris, Pepperel, MA (US); Eric K. McCall, Peterborough, NH (US)

(73) Assignee: HYTRUST, INC., Mountain View, CA (US)

( * ) Notice: Subject to any disclaimer, the term of this patent is extended or adjusted under 35 U.S.C. 154(b) by 361 days.

(21) Appl. No.: 14/978,674

(22) Filed: Dec. 22, 2015

(65) Prior Publication Data

US 2016/0224430 A1    Aug. 4, 2016

Related U.S. Application Data

(63) Continuation-in-part of application No. 14/017,754, filed on Sep. 4, 2013, now Pat. No. 8,849,764.
(Continued)

(51) Int. Cl.
*G06F 17/30* (2006.01)
*G06F 11/14* (2006.01)
*G06F 11/20* (2006.01)

(52) U.S. Cl.
CPC ...... *G06F 11/1451* (2013.01); *G06F 11/1469* (2013.01); *G06F 11/2058* (2013.01);
(Continued)

(58) Field of Classification Search
CPC ............ G06F 11/1451; G06F 11/1469; G06F 11/2058; G06F 11/2071; G06F 17/30368; G06F 17/30581; G06F 17/30997
See application file for complete search history.

(56) References Cited

U.S. PATENT DOCUMENTS 6,470,420 B1   10/2002   Hospodor
7,246,258 B2   7/2007   Chen
(Continued)

FOREIGN PATENT DOCUMENTS

EP    0401630         12/1990
EP    0410630 B1      2/1996

OTHER PUBLICATIONS

International Search Report and Written Opinion for International Application No. PCT/US2014/041486, International Filing Date Jun. 9, 2014 for DataGravity, Inc., dated Jul. 20, 2015, 28 pages.
(Continued)

*Primary Examiner* — Jeff A Burke
(74) *Attorney, Agent, or Firm* — Ascenda Law Group, PC

(57) ABSTRACT

A single system merges primary data storage, data protection, and intelligence. Intelligence is provided through in-line data analytics, and data intelligence and analytics are gathered on protected data and prior analytics, and stored in discovery points, all without impacting performance of primary storage. As data is written it is automatically mirrored for data protection as part of a High Availability (HA) process. Real-time analysis is done in-line with the HA processing, enabling a variety of data analytics. Data content can be mined from within files or blocks. The gathered intelligence is used to tag objects with extended metadata, enabling both valuable search options and rapid restore options. Data recovery begins with metadata restoration, followed by near-instantaneous access to "hot" regions of
(Continued)

data being restored, allowing site operation to continue or resume while a restore is ongoing.

15 Claims, 18 Drawing Sheets

Related U.S. Application Data

(60) Provisional application No. 61/834,806, filed on Jun. 13, 2013.

(52) U.S. Cl.
CPC .... *G06F 11/2071* (2013.01); *G06F 17/30368* (2013.01); *G06F 17/30581* (2013.01); *G06F 17/30997* (2013.01); *G06F 11/1466* (2013.01); *G06F 11/2082* (2013.01); *G06F 2201/86* (2013.01)

(56) References Cited

U.S. PATENT DOCUMENTS

| | | | |
|---|---|---|---|
| 7,376,895 B2 | 5/2008 | Tsao | |
| 7,406,488 B2 | 7/2008 | Stager | |
| 7,412,577 B2 | 8/2008 | Boyd et al. | |
| 7,552,358 B1 | 6/2009 | Asgar-Deen et al. | |
| 7,664,983 B2 | 2/2010 | Anderson | |
| 7,756,837 B2 | 7/2010 | Williams et al. | |
| 7,814,066 B1* | 10/2010 | Persson | G06F 11/1474 707/640 |
| 7,836,014 B2 | 11/2010 | Banks | |
| 7,937,365 B2 | 5/2011 | Prahlad et al. | |
| 8,032,707 B2 | 10/2011 | Iyigun et al. | |
| 8,055,745 B2 | 11/2011 | Atluri | |
| 8,140,573 B2 | 3/2012 | McKay et al. | |
| 8,185,619 B1 | 5/2012 | Maiocco et al. | |
| 8,204,863 B2 | 6/2012 | Sawdon | |
| 8,364,636 B2 | 1/2013 | Newport et al. | |
| 8,442,949 B1 | 5/2013 | Gunda et al. | |
| 8,463,798 B1 | 6/2013 | Claudatos et al. | |
| 8,825,606 B1* | 9/2014 | Zhang | G06F 21/568 707/679 |
| 8,849,764 B1 | 9/2014 | Long et al. | |
| 8,898,115 B1 | 11/2014 | Gunda et al. | |
| 9,092,502 B1 | 7/2015 | Cannaliato | |
| 9,201,906 B2 | 12/2015 | Kumarasamy | |
| 9,213,706 B2 | 12/2015 | Long et al. | |
| 9,262,281 B2 | 2/2016 | Long et al. | |
| 9,286,571 B2 | 3/2016 | Cao et al. | |
| 9,384,200 B1 | 7/2016 | Batchu et al. | |
| 9,449,038 B2 | 9/2016 | Gupta et al. | |
| 9,456,014 B2 | 9/2016 | Luo | |
| 9,514,180 B1 | 12/2016 | Cadarette | |
| 9,760,448 B1 | 9/2017 | Per et al. | |
| 2003/0105852 A1 | 6/2003 | Das et al. | |
| 2003/0145045 A1 | 7/2003 | Pellegrino et al. | |
| 2005/0273654 A1 | 12/2005 | Chen et al. | |
| 2006/0117048 A1 | 6/2006 | Thind et al. | |
| 2006/0277363 A1 | 12/2006 | Qui et al. | |
| 2009/0037479 A1 | 2/2009 | Bolik et al. | |
| 2009/0083336 A1 | 3/2009 | Srinivasan | |
| 2010/0030791 A1 | 2/2010 | Iverson et al. | |
| 2010/0036895 A1 | 2/2010 | Boyd et al. | |
| 2010/0114836 A1 | 5/2010 | Chan | |
| 2010/0191854 A1 | 7/2010 | Isci et al. | |
| 2010/0274767 A1 | 10/2010 | Irisawa et al. | |
| 2010/0293147 A1 | 11/2010 | Snow et al. | |
| 2011/0145207 A1 | 6/2011 | Agrawal et al. | |
| 2011/0264635 A1 | 10/2011 | Yang | |
| 2011/0314071 A1* | 12/2011 | Johnson | G06F 17/30091 707/827 |
| 2012/0023145 A1* | 1/2012 | Brannon | G06F 17/30082 707/822 |
| 2013/0007063 A1 | 1/2013 | Kalra et al. | |
| 2013/0054523 A1 | 2/2013 | Anglin et al. | |
| 2013/0054813 A1 | 2/2013 | Bercovici et al. | |
| 2013/0332505 A1 | 12/2013 | Karandikar | |
| 2014/0040575 A1* | 2/2014 | Horn | G06F 3/0688 711/162 |
| 2014/0074790 A1 | 3/2014 | Berman et al. | |
| 2014/0089449 A1* | 3/2014 | Bhogal | H04L 67/06 709/213 |
| 2014/0040306 A1 | 6/2014 | Gluzrnan Peregrine et al. | |
| 2014/0201364 A1 | 7/2014 | Yoshikawa et al. | |
| 2014/0223012 A1* | 8/2014 | Agarwala | H04L 41/0836 709/226 |
| 2014/0280667 A1* | 9/2014 | Hildebrand | H04L 67/1097 709/213 |
| 2014/0324920 A1* | 10/2014 | Hamilton | G06F 17/30312 707/812 |
| 2015/0012565 A1 | 1/2015 | Engberg | |
| 2015/0074037 A1 | 3/2015 | Sarferaz | |
| 2015/0074053 A1 | 3/2015 | Sarferaz | |
| 2015/0081640 A1 | 3/2015 | Long et al. | |
| 2016/0078342 A1 | 3/2016 | Tang | |
| 2016/0170844 A1 | 6/2016 | Long et al. | |

OTHER PUBLICATIONS

HDFS Users Guide <hadoop.apache.org/docs/current/hadoop-project-dist/hadoop-hdfs/HdfsUserGuide.html#Backup_Node> retrieved from the Internet Aug. 6, 2013, 7 pages.

HDFS Architecture <hadoop.apache.org/docs/current/hadoop-project-dist/hadoop-hdfs/HdfsDesign.html> retrieved from the Internet Aug. 6, 2013, 6 pages.

Non-Final Office Action dated Mar. 27, 2017, for U.S. Appl. No. 14/590,171, filed Jan. 6, 2015, 48 pages.

Amendment filed Jul. 27, 2017, for U.S. Appl. No. 14/590,171, filed Jan. 6, 2015, 10 pages.

Final Office Action dated Oct. 20, 2017, for U.S. Appl. No. 14/590,171, filed Jan. 6, 2015, 28 pages.

Non-Final Office Action dated Jun. 12, 2015, for U.S. Appl. No. 14/203,871, filed Mar. 11, 2014, 9 pages.

Amendment filed Sep. 10, 2015, for U.S. Appl. No. 14/203,871, filed Mar. 11, 2014, 10 pages.

Notice of Allowance dated Oct. 13, 2015, for U.S. Appl. No. 14/203,871, filed Mar. 11, 2014, 6 pages.

Non-Final Office Action dated Apr. 30, 2015, for U.S. Appl. No. 14/157,974, filed Jan. 17, 2014, 8 pages.

Amendment filed Jul. 28, 2015, for U.S. Appl. No. 14/157,974, filed Jan. 17, 2014, 6 pages.

Notice of Allowance dated Aug. 14, 2015, for U.S. Appl. No. 14/157,974, filed Jan. 17, 2014, 7 pages.

Non-Final Office Action dated Dec. 13, 2013, for U.S. Appl. No. 14/017,754, filed Sep. 4, 2013, 6 pages.

Amendment filed Jun. 5, 2014, for U.S. Appl. No. 14/017,754, filed Sep. 4, 2013, 9 pages.

Notice of Allowance dated Aug. 21, 2014, for U.S. Appl. No. 14/017,754, filed Sep. 4, 2013, 5 pages.

Response to Written Opinion filed Sep. 21, 2015, for European Patent Application No. 14736180.2 (filed Jun. 9, 2014), 25 pages.

Amendment before Exam filed Jul. 25, 2016, for European Patent Application No. 14736180.2 (filed Jun. 9, 2014), 19 pages.

Decision to Grant dated Mar. 23, 2017, for European Patent Application No. 14736180.2 (filed Jun. 9, 2014), 3 pages.

Non-Final Office Action dated Apr. 18, 2017, for U.S. Appl. No. 14/499,886, filed Sep. 29, 2014, 9 pages.

Amendment filed Jul. 18, 2017, for U.S. Appl. No. 14/499,886, filed Sep. 29, 2014, 7 pages.

Final Office Action dated Oct. 5, 2017, for U.S. Appl. No. 14/499,886, filed Sep. 29, 2014, 8 pages.

Amendment filed Jan. 5, 2018, for U.S. Appl. No. 14/499,886, filed Sep. 29, 2014, 12 pages.

International Search Report dated Apr. 19, 2017 for International Application No. PCT/US2016/067950 filed Dec. 21, 2016 by DataGravity, Inc., 15 pages.

(56) References Cited

OTHER PUBLICATIONS

Amendment filed May 4, 2018, for U.S. Appl. No. 14/957,025, filed Dec. 2, 2015, 10 pages.
Non-Final Office Action dated Feb. 12, 2018, for U.S. Appl. No. 14/499,886, filed Sep. 29, 2014, 6 pages.
Non-Final Office Action dated Feb. 16, 2018, for U.S. Appl. No. 14/957,025, filed Dec. 2, 2015 24 pages.

* cited by examiner

LIVE RESTORE FLOW

TRIGGERING DISCOVERY POINTS BASED ON CHANGE

CROSS-REFERENCE TO RELATED APPLICATIONS

This utility patent application is a continuation-in-part of U.S. patent Ser. No. 14/017,754 filed Sep. 4, 2013 titled "SYSTEM AND METHOD OF DATA INTELLIGENT STORAGE" which claims priority from U.S. provisional patent application Ser. No. 61/834,806, filed Jun. 13, 2013, titled "SYSTEM AND METHOD OF DATA INTELLIGENT STORAGE" in the name of Paula Long, Bryan Keith Panner, Eric K. McCall, Dmitry Bochkov, Gregory James McHale, Janice Ann Lacy, Istvan Gonczi, Andrew Ferris, and Misha Zelikov, the entire contents of both of which are hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2013, Data Gravity, Inc.

BACKGROUND

Field of Technology

This disclosure relates to computer storage systems, and more particularly to methods and systems unifying primary storage, data protection, and data analytics.

Background

Data storage solutions are large business and in large demand for many enterprises. Storage solutions are often designed for specific purposes, and companies often utilize separate systems as data silos dedicated to such purposes, such as primary storage (block and file), backup storage, and storage for analytics. These three copies of storage are generally kept on different devices and managed separately. The movement of data between these three silos can be difficult because there is time involved in determining what changed between the primary silo and backup or analytics silo. This leads to complex backup strategies that attempt to compensate for the length of time required to move the data to the backup and analytics silos. The involved timing covers both determination of what has changed since the last time the data was captured, and moving the data to the new silos typically over a network of some type. This process is usually resource intensive on the primary storage system, consuming critical primary storage resources such as processor cycles, memory, disk operations, and network bandwidth. For this reason, the data move to backup and analytics is often scheduled for off hours and carefully managed to not interfere with daily operations. In addition to processing and timing complications in moving data to backup and analytics systems, restore operations required in the case of failure or loss of primary data can also be time consuming. Further, while the restore operation is occurring primary data is generally not accessible.

In addition to the above timing and computation issues, analytics systems today, such as those using Hadoop, are independent of the primary storage system in terms of security and user account context. This complicates protection to data access, and generally loses context of when the changes occurred and who made the changes. Many systems also require multiple layers of additional third-party software to extract any information from the data.

Backup systems traditionally focus on recovery point objective (RPO) and recovery time objective (RTO). RPO represents the maximum time period of acceptable risk of data loss—for example, an RPO of 24 hours means on failure of primary storage, up to 24 hours of data might be lost and unrecoverable. RTO represents the maximum acceptable time for recovery after a failure before operation can resume—for example, an RTO of 24 hours mean on failure of primary storage, restoration from backup will take up to 24 hours before the primary system is restored and can resume normal operation.

Recovering or restoring from a backup system is generally a difficult and time-consuming process. Recovering from backup generally requires identifying a file (or set of files) and a timestamp (date). If the date or file is unknown, the already time-intensive restoration process becomes greatly more complex. Searching data within a backup system to identify a desired restoration without knowledge of the file and date is generally a trial-and-error process, such as picking a date, restoring the backup from that date, searching the restored data to identify if the data includes the desired item, and repeating the process until the desired item is found.

Once a desired file is identified, a restore process starts. Access to the file is typically not granted until the entire restore process is completed. This might result in many minutes or even hours of wait time before users can start using the restored data. This time can be significantly extended due to storage optimization techniques used when storing backup data. For example, to maximize backup capacity backups may be compressed, requiring intensive (and often complete-site) restoration to recover a single file.

There is some movement to merge backup and analytics systems into a single system which uses the backup data for analytics. This has encountered additional problems, as typically backup systems do not keep data in the same format as primary storage. Even if the format is not a problem, issues remain with moving the data and breaking the connection between the primary storage and change insights. Additionally, applying analytics to backup data has not overcome the problems around determining time and authorship of changes.

DESCRIPTION OF PRIOR ART

U.S. Pat. No. 7,412,577 "SHARED DATA MIRRORING APPARATUS, METHOD, AND SYSTEM" (Boyd et al., Aug. 12, 2008) discloses, in the Abstract, "A network component is useful in tracking write activity by writing logs containing write address information is described. The tracking component may be used in networked systems employing data mirroring to record data block addresses written to a primary storage volume during the time a data mirror is unavailable . . . . At the time a data mirror is reconstructed, the log written may be used to construct a list of block addresses pointing to locations on a primary storage volume wherein data differs from a secondary storage volume member of the mirror." This solution improves data mirroring within a storage network.

U.S. Pat. No. 7,756,837 "METHODS AND APPARATUS FOR SEARCHING BACKUP DATA BASED ON CONTENT AND ATTRIBUTES" (Williams et al., Jul. 13, 2010) discloses, in the Abstract, "Methods and apparatus are disclosed that permit the transparent bridging of a broad range of backup storage devices, such that backup software will identify an intermediate device as a one of those storage devices and will transparently send their backup data-stream thereto as part of the existing standard backup process. Upon receipt of a backup data-stream from the backup software, the methods and apparatus provide for analysis of the data elements in the data-stream, collection of management information about those data elements, and storage of the management information in an easily accessible format for subsequent review and query by users and administrators of the original data." This solution provides indexing and search capabilities to backup data.

U.S. Pat. No. 7,937,365 "METHOD AND SYSTEM FOR SEARCHING STORED DATA" (Prahlad et al., May 3, 2011) discloses, in the Abstract, "Systems and methods for managing data associated with a data storage component coupled to multiple computers over a network are further disclosed. Additionally, systems and methods for accessing documents available through a network, wherein the documents are stored on one or more data storage devices coupled to the network, are disclosed." This solution provides indexing, search, and access to data across multiple repositories including secondary storage.

U.S. Patent Application Publication 2009/0083336 "SEARCH BASED DATA MANAGEMENT" (Srinivasan, Mar. 26, 2009) discloses, in the Abstract, "The invention includes a system including one or more storage devices including the data items a metadata tagging component for associating metadata to each data item, a policy component defining one or more data management policies as a function of the metadata, a search engine for generating a list of data items satisfying the data management policy, and a data management application for applying the data management policy to each data item in the list of data items generated by the search engine." This solution creates metadata for "a priority . . . , a owner . . . , a group . . . , a last accessed time . . . , a last modified time . . . , a created time . . . , an archival time . . . , a logical location . . . , and a physical location of the data item." A search is performed of the metadata, and backup, retention, and archiving rules are applied to the search results.

U.S. Pat. No. 8,055,745 "METHODS AND APPARATUS FOR ACCESSING DATA FROM A PRIMARY DATA STORAGE SYSTEM FOR SECONDARY STORAGE" (Atluri, Nov. 8, 2011) discloses, in the Abstract, "A system for providing secondary data storage and recovery services for one or more networked host nodes includes a server application for facilitating data backup and recovery services; a first data storage medium accessible to the server application, a second data storage medium accessible to the server application; at least one client application for mapping write locations allocated by the first data storage medium to write locations representing a logical view of the first data storage medium; and at least one machine instruction enabling direct read capability of the first data storage medium by the server application for purposes of subsequent time-based storage of the read data into the secondary data medium." This solution splits (mirrors) data between primary and backup storage, providing continuous backup rather than discrete (backup-window) backups. Metadata including "source address, destination address, LUN, frame sequence number, offset location, length of payload, and time received" specific to every data frame is tracked, details of which are used in verification and compression.

None of the above provides a storage solution with 1) integrated primary storage, data protection, and data analytics; 2) in-line data analytics tracking data access and data modifications; 3) RPO based on data analytics rather than fixed time; 4) extendible metadata generation including content analytics; and 5) RTO minimized to restoration of metadata rather than complete site restoration, all without requiring separate backup data streams, or additional servers and software to coordinate operations between multiple systems. What is needed, therefore, is a solution that overcomes the above-mentioned limitations and that includes the features enumerated above.

BRIEF SUMMARY

The disclosed system merges primary data storage, data protection, and intelligence into a single system. The system provides primary storage, analytics, and analytics-based data protection without requiring separate solutions for each aspect. Intelligence is provided through inline data analytics, with additional data intelligence and analytics gathered on protected data and prior analytics, and stored in discovery points, all without impacting performance of primary storage. As data is written, it is mirrored as part of high availability (HA) processing. Real-time analysis is done in-line with the HA processing, enabling a variety of data analytics. Data content can be mined from within files or blocks. The gathered intelligence is used to tag objects with extended metadata, enabling both valuable search options and rapid restore options. Data recovery begins with metadata restoration, followed by near-instantaneous access to "hot" regions of data being restored, allowing site operation to continue or resume while a restore is ongoing.

With the disclosed system, a primary storage processor works in conjunction with an intelligence processor to store and protect the data on separate sets of disks while gathering intelligence as the data is created. Thus the disclosed storage system manages primary and HA stream data, the ability to extract information about the data, the data usage, and collects analytics around the data content. By using a single HA storage system to manage everything, processors and IO capacity normally dormant or underutilized may be put to use for gathering data intelligence, data protection, and delivering search and analytics. Data extraction may include metadata extraction, content extraction, and fine grain block-level access and change tracking. For file based primary storage, analysis may track file and metadata changes, including block-level changes, as data is written. For block based primary storage, analysis may track block level access and changes. Further, the system is capable of understanding data in a higher level application stream context, and performing tracking and analysis at a block level that is similar to file level analysis. This enables stream-level analysis such as for data being stored to a database. As data is written to intelligence storage, a copy of the data that is in memory is analyzed in parallel for data intelligence. Unlike traditional systems that are constrained by speed of data movement, this architecture allows for rapid processing of the data. Using this initial intelligence scan of the data, the data can then be post processed to gather more in-depth insights.

Analytics are available in near real time for end users. Preprocessed data is stored as incremental metadata to individual data objects and in separate data structures that can be queried. Unlike traditional data analytics systems, intelligence is not completely separated from the original data source. Analytics metadata is stored within discovery points. Each discovery point contains the analytics for the accessed and changed data associated with that discovery point, and optionally a copy of the data that has changed since a prior discovery point. By keeping the most commonly used intelligence as part of the metadata, the disclosed system reduces the response time to end users' requests for intelligence dramatically. The system also has access to added features of the data: who accessed or made a data change and when was the data accessed or changed. These added features allow the intelligence system to provide additional context for search and analysis.

An HA stream is used to create intelligence data, thereby providing a source for both data analytics and real-time protection of the customer data. Discovery points are created through the intelligence system based on the intelligence data, not primary storage data, which removes impact on primary storage during discovery point creation. Discovery points are stored on separate storage media from storage of the primary data stream. Discovery point creation can be based on time, but also can be analytically implemented based on an adaptive schedule. This adaptive behavior is achieved by actively monitoring access, changes, and change rates over time. This is done at a share or volume level and may take into account who owns and who accesses the data. The adaptive schedule may create discovery points as a result of hitting a threshold of percent change across the total data or across a designated portion of the total data, or after detecting anomalies in the amount of data changes based on historical analysis of data change rates over time.

Retaining data within a discovery point enables data recovery. However, from a recovery standpoint, traditional RPO is changed. Discovery points are created based on the intelligence data, which removes impact on primary storage during discovery point creation. This protects data in real-time, reducing RPO to zero.

The system additionally minimizes RTO to near zero. Two options for restoring data are available—object level restores or full site restores.

Object level restore recovers metadata using data and intelligence metadata about an object within a discovery point. An object can be a file, directory, file share, volume, or a file or directory within a complex object such as a file within a file system within a virtual machine disk (VMDK), or a directory within an archive. As soon as the metadata is restored for primary storage, the object appears restored to end users with input/output (I/O) access granted. "Hot" data within the object, such as data actively being accessed by an end user or identified as prioritized for fast recovery based on previously gathered analytics over time, is restored with priority to primary storage, while any remaining data is back-filled with lower priority, ensuring the object will be fully restored. Data accessed within the object during the restore may have a slight access performance reduction, but availability of the restored object is near immediate.

Site level restore is to recover an entire site or portion of site, such as after a complete or partial failure of primary storage. A site level restore is not as instant as an object level restore, but is structured to enable site operation to resume quickly, potentially within a matter of minutes. Traditional RTO is measured in days and hours. With a site level restore, internal system metadata is quickly recreated for the site being restored, after which end users may access data. As in the object level restore case, "hot" data being actively accessed or analytically identified is given priority for data restoration while other data is back-filled at lower priority, guaranteeing eventual complete restoration while also enabling rapid access for recovered functionality. Site level restores could take longer than object level restores before end user operation can continue due to the larger scale of metadata required.

While a restoration is in process, new data changes may be made. All new changes are tracked and protected, and analytics gathered, even if the entire restoration has not completed.

Features and Advantages

The disclosed system combines primary storage, data analytics, data protection, and recovery into one system.

The disclosed system does not require additional data streams, additional servers or other appliances, or additional software to be deployed beyond the ones traditionally found in primary storage environments.

The disclosed system tracks data changes in real-time, which eliminates pre-processing needed to perform data protection and avoids post-processing of data to detect changes or querying application servers for data changes.

The disclosed system creates a full text index of stored data, along with automatically created metadata tags which classify the data. This tagging enhances the data discovery process.

The disclosed system retains analytics metadata for accessed and changed data and, optionally, data changes in discovery points.

The disclosed system extends discovery point creation to be time based, percentage based, and analytically adaptive. The system maintains a current working version of content changes from the last discovery point, removing any risk-of-loss window on primary storage failure.

The disclosed system eliminates back-up windows and back-up scheduling.

The disclosed system provides immediate data protection through real-time redundancy of primary data.

The disclosed system creates content-specific intelligence of stored data, allowing for rapid search and identification of desired discovery points and data within them.

The disclosed system enables real-time selective restore based on search of gathered data intelligence.

The disclosed system tracks a rich set of operational behavior over time on the data such as access patterns of users to allow for tracking maps of content to people.

The disclosed system may include off-site archival storage in addition to on-site data protection, enabling both rapid recovery and long-term storage while maintaining near instant restore, analytics, and searchability on the local site.

The disclosed system enables data intelligence gathering and analytics without any impact to primary storage performance or availability.

The disclosed system provides a programming interface allowing connection by third party data intelligence packages. This includes custom defined application programming interfaces (APIs) as well as using traditional file and block access to manage, such as search, query status, etc., and retrieve analytics.

The disclosed system enables near-instantaneous access to data, such as individual files, directories, or file systems, being restored.

The disclosed system significantly reduces the time to resume operation after initiating a full site recovery in case of complete primary or intelligence system loss.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION OF A PREFERRED EMBODIMENT

Terminology

Figure 1:
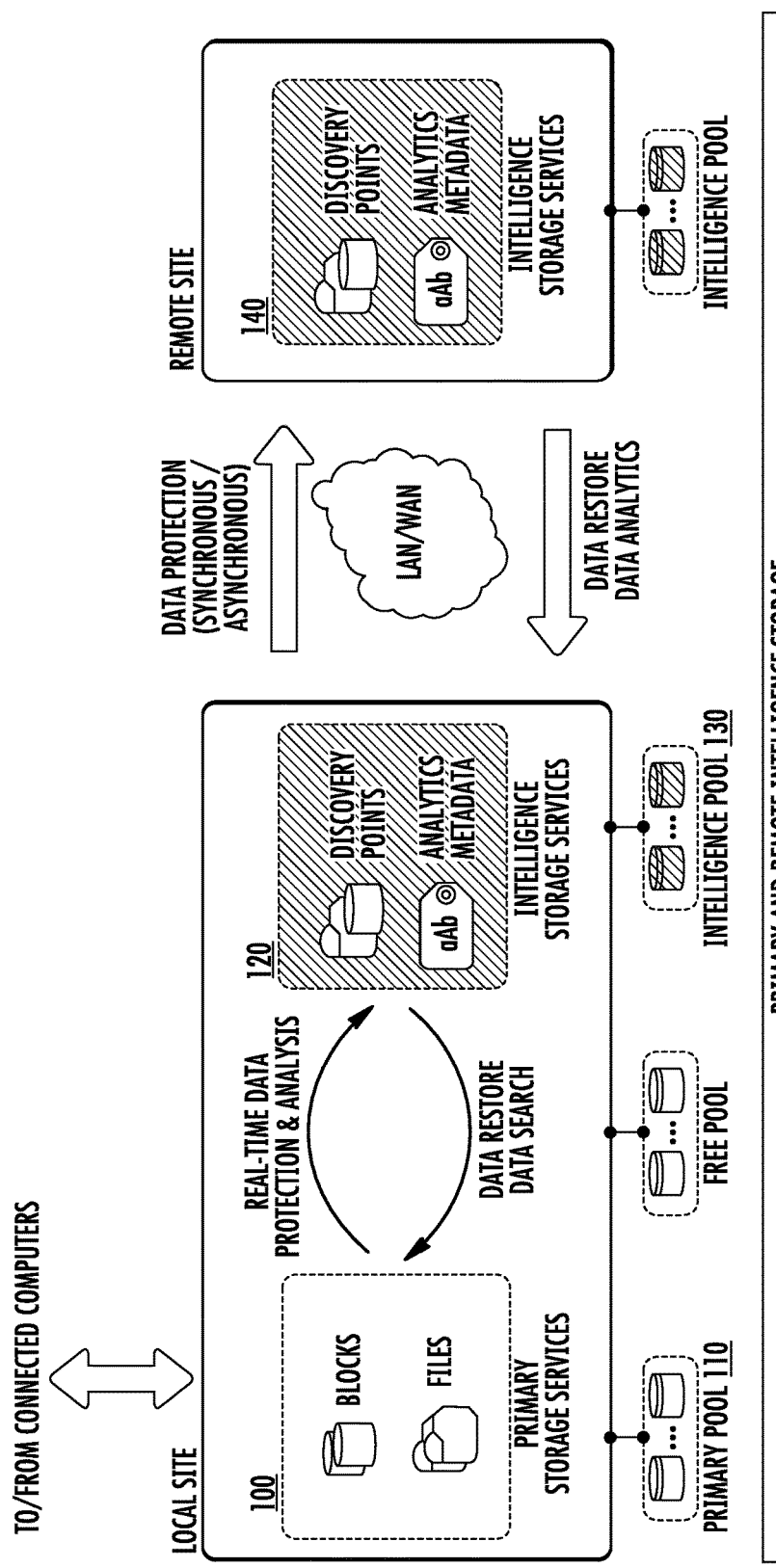
FIG. 1 is a diagram showing interaction between a Primary Node, Intelligence Node, and Remote Intelligence Node, and connected storage pools.

The terminology and definitions of the prior art are not necessarily consistent with the terminology and definitions used herein. Where there is a conflict, the following definitions apply.

Primary Storage: networked storage accessible to multiple computers/workstations. The storage can be accessed via any networked device, either as files or blocks. Unless explicitly stated, "primary storage" refers to both blocks and files.

Intelligence Storage: secondary storage containing gathered intelligence, discovery points, and a redundant real-time copy of files and block data contained in Primary Storage.

Primary Node: includes access protocols to communicate with an Intelligence Node, Remote Sites, and Expansion Nodes; access protocols layer (for example, NFS, SMB, iSCSI); protection and analytics in real-time ("PART") layer; file and block storage layer (file system, block volume); and connection to storage devices (RAID, DISK, etc.). A Primary Node appears to system users as Primary Storage, and provides an interface and controls to act as the access to Intelligence Storage.

Intelligence Node: includes access protocols to communicate with a Primary Node, Remote Sites, and Expansion Nodes; data intelligence storage layer (intelligent data services & rules processing); file and block storage layer (file system, block volume); and connection to storage devices (RAID, long-term storage). In the preferred embodiment, intelligence node data is accessed by users through a Primary Node, but in alternate embodiments Intelligence Nodes may be directly accessed by users.

Discovery Point: A discovery point, created from a mirrored (high availability) copy of primary data, contains data analytics for accessed and changed primary data since a prior discovery point. A discovery point may contain the changed data, providing for a virtually full but physically sparse copy of the primary data captured at a user-specified point in time or dynamically based on change rate or other analytics. While primary data does not change within a discovery point after the discovery point was created, analytics metadata stored in a discovery point can be expanded as deeper levels of user data analysis are performed and more analytics are gathered. Tracked primary data changes can be retained for the life of the discovery point or can be removed at scheduled or dynamic intervals, such as after deep data analysis is complete and desired analytics metadata is obtained. Removing primary data allows for more efficient space utilization, while retaining primary data enables point-in-time recovery of that version of data.

Change Catalog: an ordered set of real-time access and change information related to a data object, tracked at a discovery point granularity. A change catalog tracks who, how, when, and where aspects of a data object being accessed and/or modified. There is one change catalog for every discovery point.

Remote Site: one or more off-site nodes in communication with local site primary or intelligence nodes.

Pool: the collection of data storage connected to a node.

Object: a file, directory, share, volume, region within a volume, or an embedded object. Objects can be complex, containing other embedded objects. For example, a file can be a container containing other files, or a volume can have a file system on top of it which in turn contains files. The system is capable of recognizing complex objects and tracking changes at finer embedded object granularity.

Selective Restore: an automatic (policy based) or manual (customer initiated) restore at an object level.

Site Restore: a manually initiated process to recreate primary or intelligence pool content using a previously protected version of the data being restored.

Container: objects which may have other embedded objects, such as a file, directory, file system, or volume.

Expansion Nodes: appliance having a processor, memory (RAM), network connectivity, and storage devices, and connected to one or more primary or intelligence nodes scaling the processing power and/or storage for connected nodes.

Operation

In the following detailed description, reference is made to the accompanying drawings which form a part hereof, and in which are shown, by way of illustration, specific embodiments in which the invention may be practiced. It is to be understood that other embodiments may be used, and structural changes may be made without departing from the scope of the present invention as defined by the claims.

The disclosed high availability (HA) storage system provides primary storage, analytics, and data protection. The system provides primary storage access as block and/or file level storage while avoiding single points of failure. The system collects analytics in real-time while also protecting data in real-time on separate physical media, and includes options for off-site data protection. The system implements deep analytics enabling restore, storage, and data intelligence, and protects both customer data and associated analytics. The system provides traditional file based and custom API methods for extracting analytics metadata. The system provides for near-instantaneous (live) restore at the object level, and significantly reduced wait-before-access time in case of primary or intelligence node complete failure (aka full site restore). The system provides for fan-out scalability of storage and intelligence for dynamic growth and expansion.

Referring to FIG. 1, Primary Node 100 of the system connects within a network to provide block and/or file level storage access to connected computing devices (not shown), real-time data protection, and real-time analytics of primary data. Primary data is read from and written to primary storage pool 110. The data can be written or read as files or blocks depending on the access protocol being used. As the data is written it is automatically mirrored and tracked for data protection as part of a HA process for the primary node. The mirrored cache of the data is created for Intelligence Node 120. The Intelligence Node enables data protection, analytics, and recovery. The Intelligence Node stores a real-time copy of primary data, analytics and discovery points within intelligence pool 130. Discovery points are automatically or manually created at any point by the Intelligence Node, and based on fine grained change data enabling action to be taken immediately with no need to copy the underlying primary data or do any post processing to determine what has changed since any prior discovery point.

In a preferred embodiment, each Node is capable as acting as either a Primary Node, an Intelligence Node, or both. For reliability and performance reasons, separate Primary and Intelligence Nodes are desirable. In case of failure of either node, the other may take over operation of both. Implementation without dual-capability (that is, operating solely a Primary Node and solely an Intelligence Node) is possible but loss of service (to either primary or intelligence storage) would occur on failure of such a node. In a preferred embodiment, each one of the Nodes has a processor and local memory for storing and executing Node software, a connection to physical storage media, and one or more network connections including at least a dedicated high bandwidth and low latency communication path to other Nodes.

Figure 2:
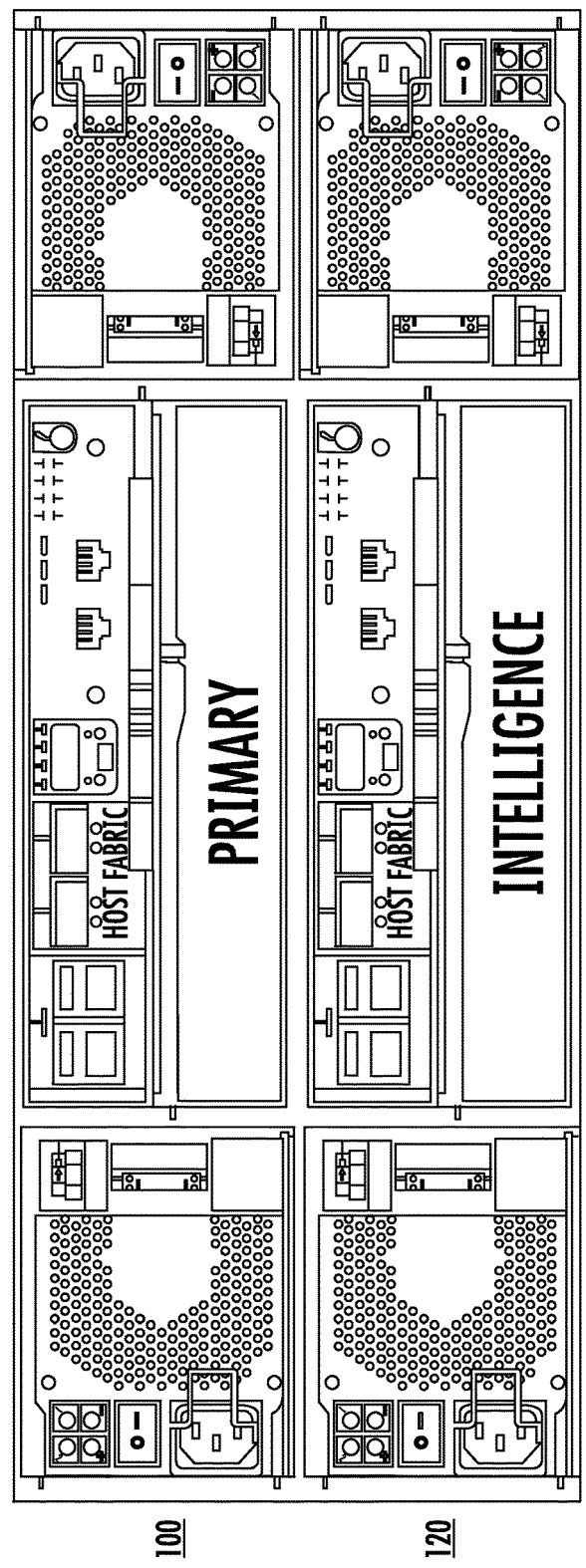
FIG. 2 is a view of an appliance device containing Primary and Intelligence Nodes.

In a preferred embodiment, the Primary Node and Intelligence Node are physically housed within a single device, creating a user impression of a single appliance. FIG. 2 shows one such example, with Primary Node 100 and Intelligence Node 120 housed together to appear as a single physical appliance. Implementation may be with any number of disks, for example such as a four rack units (4U) housing containing up to twenty-four hard drives, with separate physical storage devices connected to the system. Internally each node is completely separated from the other with the exception of a backplane, with each node having a dedicated (not shared) power supply, processor, memory, network connection, operating media and optionally non-volatile memory. Separation enables continued operation, for example the Intelligence Node may continue operating should the Primary Node fail, and vice versa, but shared resource implementation is also possible.

Primary Node

Figure 3:
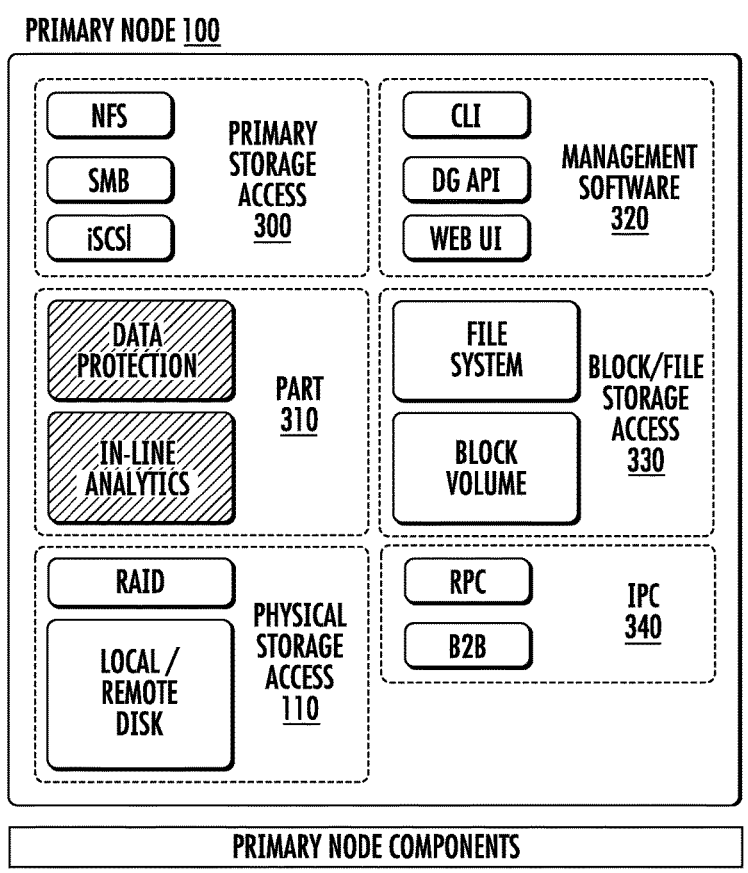
FIG. 3 is a diagram showing the components of a Primary Node.

Also referring to FIG. 3, a node actively operating as Primary Node 100 operates storage protocol server software 300, for example Common Internet File System (CIFS), Network File System (NFS), Server Message Block (SMB), or Internet Small Computer System Interface (iSCSI), so the Primary Node will appear as primary storage to network-connected computer devices. The storage protocol server software also communicates with a protection and analytics in real-time process (PART) 310 which intercepts and takes action on every data access.

The PART 310 performs three main roles after intercepting any data access request: mirroring primary data for HA, gathering in-line data analytics on primary data, and storing primary data. The examples explained herein are directed to a file access perspective, but the PART can similarly process block level accesses. When performing block access to a volume, the PART can identify embedded objects and perform the same analysis that is applied to file-level accesses. Intercepted access requests include read, modify (write data or alter attributes, such as renaming, moving, or changing permissions), create, and delete. The PART tracks and mirrors the request (and data) to the Intelligence Node. Communication with the Intelligence Node is through synchronous or asynchronous inter-process communication (IPC) 340 depending on configuration. IPC may including any suitable protocols or connections, such as Remote Procedure Call (RPC) or a Board-to-Board (B2B) high performance, low latency communication path that may be hardware specific. Any data included with a data access request, such as included in write operations, is also mirrored to the Intelligence Node as part of HA system operation. This mirroring establishes data protection through real-time redundancy of primary storage. Additionally, the PART executes in-line analysis of primary data, gathering real-time analytics. The PART sends gathered real-time analytics to the Intelligence Node, where the analytics are added to a change catalog maintained by the Intelligence Node. In addition to analytics, the PART directs the request to an actual file system, for example Fourth Extended FileSystem (EXT4) or Z File System (ZFS), or block volume for file or block storage access 330 to physical storage devices.

The storage access function 330 (be it file system level or block level) performs the access request on storage media, and returns the result to the PART for return to the requesting system. In a preferred embodiment, the storage media includes disks attached to the system, but other storage media solutions are possible.

In a preferred embodiment, the Primary Node also includes the software necessary to operate as an Intelligence Node in case of Intelligence Node failure.

In a preferred embodiment, the Primary Node also operates management software. Preferably accessed through a browser interface (although any user interface provision method may be used), the management software provides system administrators access to configure and manage system users and access discovery points for the restore process.

Intelligence Node

Figure 4:
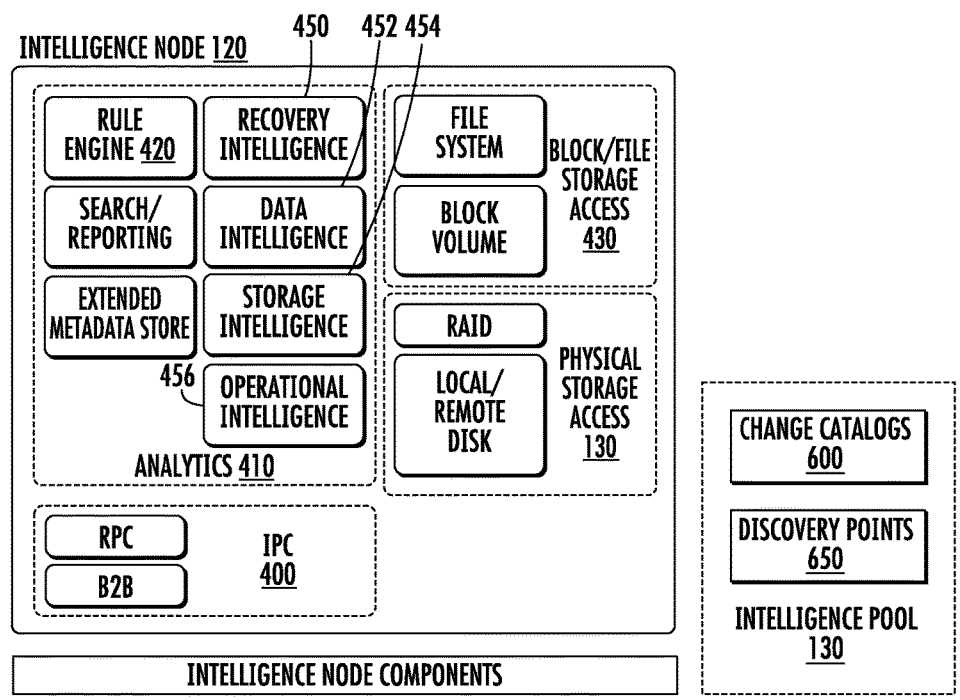
FIG. 4 is a diagram showing the components of an Intelligence Node.

Referring also to FIG. 4, a node actively operating as Intelligence Node 120 operates communication inter process communication (IPC) software 400 capable of communicating with the Primary Node. The communication software includes an API to receive real time analytics (change catalog entries) from the Primary Node, data change and access requests (read, modify, create, delete) from the Primary Node, data protection and intelligence control commands, and data restore commands. Data protection and intelligence control commands include commands for creating discovery points, setting up management rules for managing discovery points (including deletion), and searching and restoring content that has been backed up. Data restore commands include commands for accessing previously backed up data.

Data change requests that are received at the Intelligence Node are applied to that node's copy of current data, thereby maintaining a real-time mirror of primary storage. This implements real-time data protection for the current data.

For data analytics and data recovery purposes, the Intelligence Node maintains a change catalog 600 containing real-time analytics gathered from accessed and changed data since the last discovery point 650. A discovery point is also created by associating and storing a change catalog together with reference to the mirrored copy of changed primary data since the last discovery point as maintained in the intelligence pool. A more detailed discussion of the change catalogs and discovery points is provided below.

The Intelligence Node implements file or block-level access 430 to its own pool 130 of physical storage. This intelligence storage pool retains the real-time copy of primary data and discovery points. The stored intelligence data within discovery points includes in-line analytics (change catalog) as received from the Primary Node and additional analytics 410 executed by the Intelligence Node.

The real-time copy of primary data also enables distributed response processing between the Primary and Intelligence Nodes. For example, load balancing between the Primary and Intelligence Nodes may enable greater scalability. As both have real-time copies of primary data, read requests may be balanced between the nodes, or alternatively directed to both nodes with the fastest-to-respond used for the response. The Primary Node may act as a controller for such distributed processing, or a separate controller may be used.

There is no requirement that the Primary 110 and Intelligence Data 130 reside on the same appliance, they can be distributed to multiple discrete appliances deploying all the same techniques with the exception that the communication method is performed over a network transport instead of using the HA mechanisms within an array.

Analytics

Intelligence is at the core of the system. There are four types of intelligence functions in the system: Data, Operational, Storage, and Recovery. All four use the same processing engine and common analytics metadata to provide analysis both at fixed points and as gathered over time. Data Intelligence 452 allows for intelligent user content management. Operational Intelligence 456 analyzes the behavior of the system and application logs stored on the system to provide insight into applications and security of the system. Storage Intelligence 454 allows for intelligent storage system resource management, including automatic storage allocation and reallocation including dynamically growing and shrinking storage pools. Recovery Intelligence 450 allows for intelligent data protection and data restore. All types of intelligence may be used for, or enable operation in conjunction with, different types of analytics, such as, but not limited to, collaboration, trending, e-discovery, audits, scoring, and similarity.

Analytics begin at the Primary Node, which tracks data access and data modifications, system behavior, change rates, and other real-time analytics. It provides this real-time analytics information to the Intelligence Node. Intelligence gathering determines time and owner relationships with the data for collaboration and contextual information about the data. The gathered intelligence is used for later search and reporting, and is tracked in change catalogs associated with the data.

Figure 5:
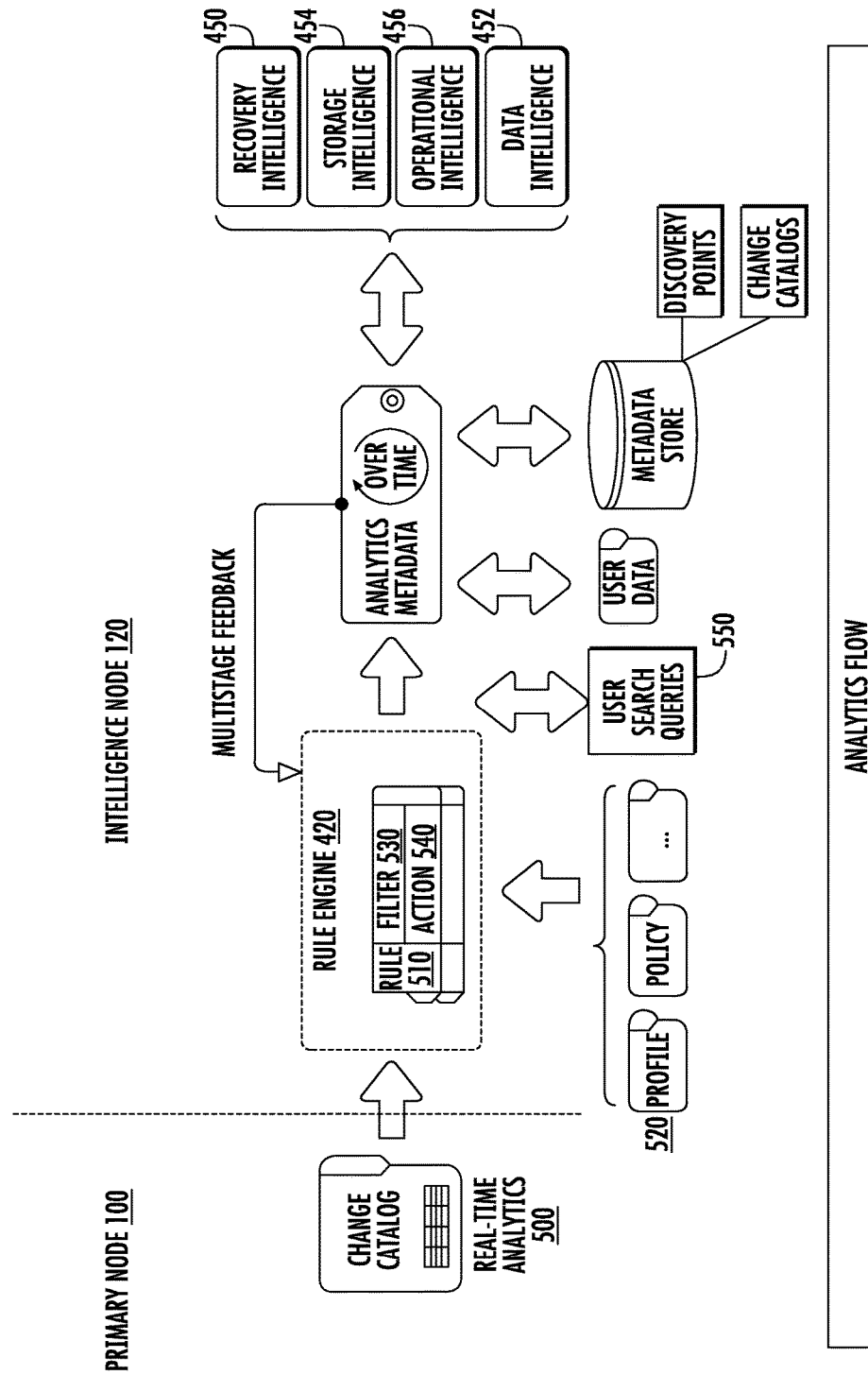
FIG. 5 is a diagram showing the analytics flow process.

Referring now to FIG. 5 and to FIG. 6A, change catalogs 600 are created as part of in-line real-time analytics 500 performed by the Primary Node 100, but change catalogs 600 are then also further expanded by the Intelligence Node 120 performing further data processing, and create the foundation for later search. The change catalog data is initially created in real-time at the Primary Node (such as via PART 310) and includes extended information about the specific data access, for example, allowing complete tracking of who/how/when/where accessed, created, modified, or deleted a file or other data object. Traditional file metadata includes only an owner, group, path, access rights, file size, and last modified timestamp. This provides some, but not complete, information about a file. For example, it does not identify who modified the file, how many modifications have occurred, or any information about file accesses (such as viewing or reading a file) which do not modify the file. The PART, operated by the Primary Node, intercepts every file access event. Thus the Primary Node has the ability to track extended metadata about a file—including identification of every modification and every access, even those which do not modify the file, by timestamp, user, and type of access.

Figure 6A:
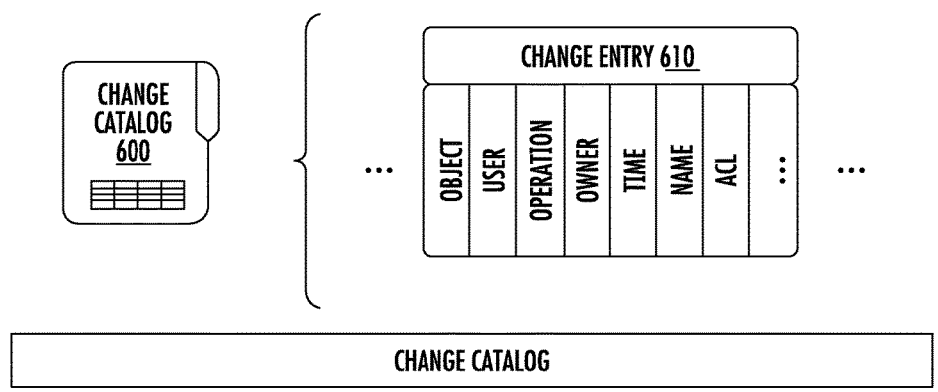
FIG. 6a is a diagram showing the structure of a change catalog.

Referring also to FIG. 6A, this extended metadata is stored as a change catalog entry 610 that identifies the object being accessed, the actor (user performing an operation), and the operation being performed. Additional information which may be in a change catalog entry includes, but is not limited to, object name, owner, access control lists, and time of operation. The change catalog 600 contains this extended metadata information, and serves as the foundation of further analytics, such as performed later by the Intelligence Node. The change catalog entry may also include security information, such as permission rights for access, associated with the object. An administrator may configure the degree of tracking, or even enable/disable tracking on a file location, user, group-specific, or other basis, and the Primary Node is capable of incorporating all details of every file access into the change catalog entries. These change catalog entries of enhanced metadata are gathered by the Primary Node and transmitted to the Intelligence Node for storing and expanding with further analytics.

Figure 6B:
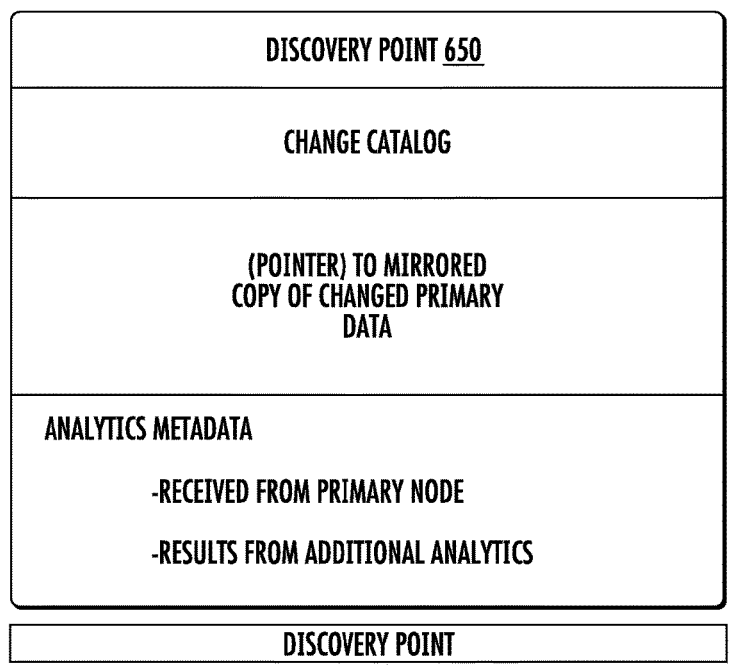
FIG. 6b shoes a discovery point.

With reference now also to FIG. 6B, the change catalog metadata tracks incremental changes which are also linked to a discovery point 650. Every time a new discovery point is created the current change catalog is closed off and stored within the discovery point. When data is retained in the discovery point, the system may be configured to retain a copy of the discovery point analytics metadata at the Intelligence Node even if that discovery point is migrated off the Intelligence Node, enabling more efficient query processing.

A discovery point 650 is created by associating and storing a change catalog together with the mirrored copy of changed primary data since the last discovery point in the intelligence pool. After a discovery point creation, a new change catalog 600 is created allowing gathering of new real-time analytics on primary data. Change catalogs and discovery points are preferably maintained per volume or file system in primary storage, but may also span multiple volumes or file systems. Discovery points allow deeper analytics on a point in time version of primary data, and can also be used to recover a prior version of primary data. A discovery point contains data analytics for accessed and changed data since a prior discovery point. When created, a discovery point also contains a virtually full but physically sparse copy of primary data at the time of creation of that discovery point. The system uses data visible within discovery points to perform deeper data processing, creating more analytics metadata. The analysis is done on accessed and changed data since a previous discovery point, using the real-time analytics reflected in the change catalog. These newly gathered deeper analytics are also stored within the discovery point. Primary data may be retained for the life of the discovery point, or may be removed earlier, such as after the deep data analysis is complete and desired analytics metadata obtained. Removing the primary data allows for more efficient space utilization, while retaining the primary data enables recovery of primary data at the point in time of the creation of the discovery point. From one discovery point until the creation of a next discovery point, file changes, deletions, renames, creations and such are tracked as cumulative modifications to from the prior discovery point, so that only incremental changes are maintained. This creates a version of the data at each discovery point. While the data is retained in a discovery point, the system is able to restore data at the discovery point granularity. As change catalogs are stored with each discovery point, information about change history between discovery points may be available through analysis of the change catalog. To restore a data object at a particular point in time, a discovery point is used. For long-term storage, discovery points may be moved to long-term media such as tape or off-site storage as configured through the management software.

Intelligent rules can be applied to automate discovery point creation, such that, in addition to manual or time-based creation, discovery point creation may be triggered by content changes. Such changes may be percentage based, specific to percentage change of certain identifiable subsets of the entire data pool, based on detected deviations from usage patterns such as increase in frequency of specific accesses, or based on real-time analysis of data content.

In one example implementation, the automatic creation of a discovery point may be triggered based upon a percentage change in some identifiable subset of the stored data. This percentage change can be determined by a filter 530 and corresponding action 540 in the rules engine 420 in the intelligence node 120. In other implementations the percentage change may be monitored by the in-line analytics functions (PART 310) of the primary node 100. In still other implementations, the percentage change may be monitored by functions performed by an underlying file system in the primary 100 or intelligence node 120.

Some notion of importance can provide a further advantage to the percent change trigger. For example creating discovery points on a simple, fixed, time-based schedule does provide an advantage if a lot of temporary files are created and deleted in the interim (especially if the fixed schedule is a long period of time such as 12 hours). In such a scenario where a lot of temporary files are changed, creating a discovery point based solely on percent change might result in a lot of discovery points being created with unimportant data.

Thus, in some implementations, the automatic discovery point creation policy may first adjust the percentage change (or the threshold that the percentage change is compared against) by a weighting factor. The weighting factor applied against the percentage change can depend upon a number of things that reflect the importance of the data.

In one example, the weighting factor can be related to the identity of a user associated with the data (such as may be found in the change entry 610 as described in connection with FIG. 6A). Thus some user's data may be considered more important than other user's data, with the more important user's data being stored in discovery points more frequently. For example, the document files modified by an Executive Assistant to the Chief Executive Officer of a manufacturing company may be given a stronger weight than the files modified by a part-time salesperson. The weight may also be assigned because one user (such as a network administrator user) may be expected to modify temporary files more frequently than other users (such as a quality assurance specialist on the manufacturing floor). In the later case, because the network administrator may be more likely to be modifying large numbers of temporary files, it may not necessarily be desirable to trigger a discovery point for files that are expected to be changed frequently anyway.

In other implementations, the importance or weighting factor may depend upon the location or some other attribute of the files which contain or relate to the data in some way. For example, changes made to data files located in one directory may trigger a discovery point more frequently (such as a directory where transaction database files are located) than changes made to data files located in other directories (such as a directory where system-level temporary files are stored). In other instances the name of a file, its access control list, or its type may be used to determine the weighting factor. For example, files with an extension of ".tmp" may be given a lesser weight than files of having a ".docx" or ".dbf".

Other attributes of the data itself may also be used to weight the triggering of discovery points. These may include the identity of the application that is accessing the data, or the type of data being accessed. For example, files known to belong to an electronic commerce transaction system may be given a higher priority than web browser history files.

Discovery points can be deleted manually through a delete discovery point command, or automatically based on time or analysis in order to save storage space or for off-site migration. Deletion of discovery points is complicated by management of analytics metadata. The analytics metadata stored within a discovery point contains information about data changed within a period of time. If the stored analytics are deleted they can be lost. To prevent this, the time period for analytics associated with one or more other discovery points can be adjusted, and relevant portions of analytics metadata from a discovery point being deleted extracted and merged with other analytics already stored within the other discovery points.

Returning attention now to FIG. 5, at the Intelligence Node, an adaptive parallel processing engine, or Rule Engine 420, operates on the change catalog 600 to derive these more complex analytics, including tracking changes and use over time. The Rule Engine applies rules 510 to analyze content on the underlying primary data, enabling deeper analytics on stored data. As an example, a second level dictionary can provide sentiment attributes to an already indexed document. Regular expression processing may be applied to see if a document contains information such as social security or credit card numbers. Each rule may have a filter 530 to match content, and an action 540 to take based on results. Rules can be nested, and used to answer user-specific questions. Another example may be to apply locations where keywords appear, for example to search objects for a set of keywords such as "mold" or "water damage," and in all matches to search the objects for address or zip code information. Rules are configurable by administrators or system users, allowing dynamic rule creation and combination based on different applicable policies 520. Rules can be combined in multiple ways to discover more complex information. Rules may also be configured for actions based on results. For example, notifications may be set to trigger based on detected access or content, and different retention policies may be applied based on content or access patterns or other tracked metadata. Other actions may include, but are not limited to, data retention, quarantine, data extraction, deletion, and data distribution. Results of applied rules may be indexed or tracked for future analysis.

As applied rules 510 identify results, such results may be indexed or tracked for other analytical use. This additional metadata may be added to the change catalogs for the relevant files or objects. The metadata may also be tracked as custom tags added to objects. Tags may be stored as extended attributes of files, or metadata tracked in a separate analytics index such as data in a directory or volume hidden from normal end user view, or in other data stores for analytics. Rules, and therefore analytics, may be applied both to data tracked and to the metadata generated by analytics. This enables analytics of both content and gathered intelligence, allowing point-in-time and over-time analysis. The rules results and actions may serve as feedback from one or more rules to one or more other rules (or even self-feedback to the same rule), enabling multi-stage analysis and workflow processing.

Recovery Intelligence 450

Recovery Intelligence is the set of analytics implemented by Intelligence Node 120 around data protection. The purpose is to protect data and associated analytics. When data reaches the Intelligence Node a mirrored copy is stored in the intelligence pool, creating redundancy with primary storage, and these changes are tracked for use in discovery point creation. Primary data, discovery points, and intelligence data are preferably separated on actual physical media at the spindle or disk pool level, such that a failure of a single individual physical device is always recoverable. As discovery points are created based on change catalogs tracked at the Intelligence Node, they can be created at any time without any impact on the performance of primary storage. This eliminates a need to schedule time-windows for discovery point creation. Each discovery point includes incremental changes from the prior discovery point, including data object changes and the analytics gathered and associated with the data during such changes. Intelligent rules can be applied to automate discovery point creation, such that, in addition to manual or time-based creation, discovery point creation may be triggered by content changes. Such changes may be percentage based, specific to percentage change of certain identifiable subsets of the entire data pool, based on detected deviations from usage patterns such as increase in frequency of specific accesses, or based on real-time analysis of data content.

At the creation of a discovery point, the change catalog accumulating real-time changes is closed. The change catalog is then stored within the created discovery point, and a new change catalog created for changes to be associated with a next created discovery point. The analytics and data stored within discovery points enable efficient restores, allowing search over multiple discovery points for specific object changes without requiring restoration of the data objects from each discovery point. Such search can be based on any analytics performed, such as data tracked in the extended metadata and content-based analysis performed by application of the Rule Engine. The tracking further enables indexing and partial restores—for example specific objects, or embedded objects within complex objects, can be restored from a discovery point without a complete restore of all data from that discovery point.

Data Intelligence 452

Data Intelligence is a set of analytics at the Intelligence Node analyzing content. Data Intelligence operates through the Rule Engine, and can be applied to unstructured data, for example file metadata such as document properties of Microsoft Office documents or the actual content of such documents, semi-structured data such as log files or specific applications such as Mail programs, structured data such as databases or other formats for which schema may be known or discovered by the system, and recursive containers such as virtual machines, file systems on file systems, file systems on volumes, or archives.

Storage Intelligence 454

Figure 7:
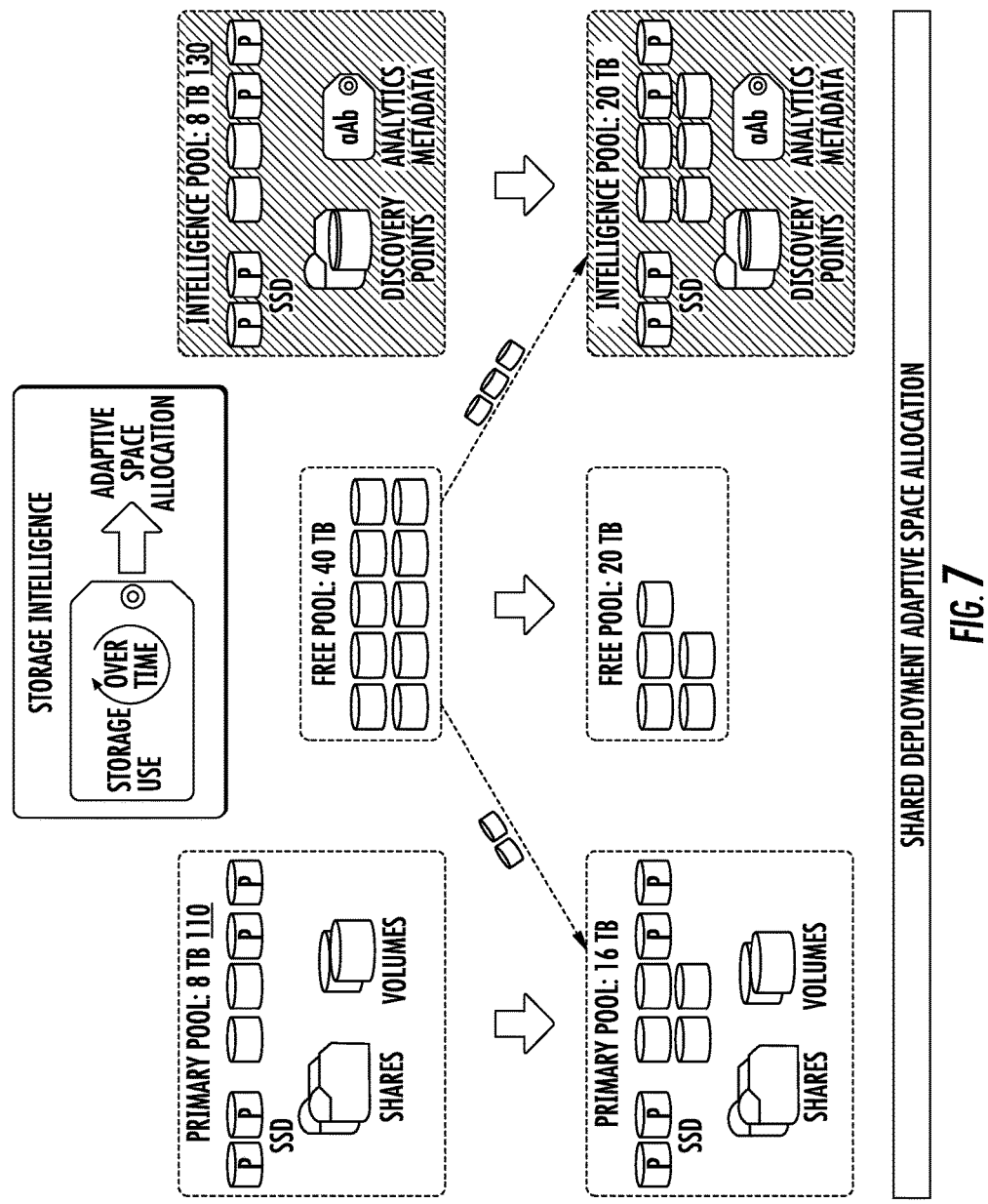
FIG. 7 is a diagram showing adaptive allocation of available storage.

Storage Intelligence is a set of analytics performed by the Intelligence Node analyzing the entire system. Storage Intelligence operates through the Rule Engine to track total storage and system use over time to both predict usage patterns and analyze capacity needs. Referring also to FIG. 7, available physical storage can be dynamically adjusted, such as the allocation of physical devices between primary storage 110 and intelligence data storage 130, maximizing use of the system before expansion is required. The example shown in FIG. 7 illustrates allocating a portion of unused storage between a primary pool and an intelligence pool. Similarly, space can be reclaimed from assigned pools when no longer needed. For example, in reverse of the shown example, excess storage assigned but not used by the primary pool can be identified and dynamically removed from the primary pool to a spare pool or directly reallocated to an intelligence pool. This dynamic allocation and reallocation occurs without degrading storage availability. Dynamic reallocation may move data within portions of a data pool to ensure such degradation does not occur. The same dynamic allocation may also be applied when expansions are added, enabling intelligent maximization to storage resources to continue after expansion. Storage Intelligence may be applied to improve resource usage efficiency, such as identifying processing demands, patterns of system usage, and scheduling flexible high demand processes during periods of low usage. For example, some Rule Engine analytics can be batched to run periodically, and dynamically scheduled based on predicted system use.

Operational Intelligence 456

Operational Intelligence is done by integrating the application logs stored in primary storage and determining usage patterns, errors, and/or anomalies in the logs. Operational Intelligence also monitors access patterns for the data and alerts designated administrators on inconsistent behavior such as possible signs of security issues.

Intelligence Searching

With only the inline analytics, real-time searching is enabled for immediate results such as: who, when, or who and when, was a specific file accessed; which files were accessed by specific users; are access patterns consistent with appropriate file access rights; or which files were modified (or viewed) within a certain time period. If additional in-line or secondary analytics are enabled, the intelligence is expandable to include content-specific search.

Searches are performed by users submitting user search queries 550 to the system, but also taking security into account. There are at least two levels of access provided: super user (administrator) and individual user. Super users and individual users are authenticated (for example using Active Directory or a local user database). Individual users are able only to see the results that they are authorized at the time of the search. Individual user rights may be configured by authorized administrators, or default to match existing user rights. For example, access to analytics for search purpose may be restricted by default to analytics associated with data objects the user has or had permission to access in primary data. This preserves permissions and data security of intelligence data which matches the permissions and security for primary data without requiring manual account configuration of manual access permission configuration of intelligence data. Super users are able to see all results.

Data Protection

Figure 8:
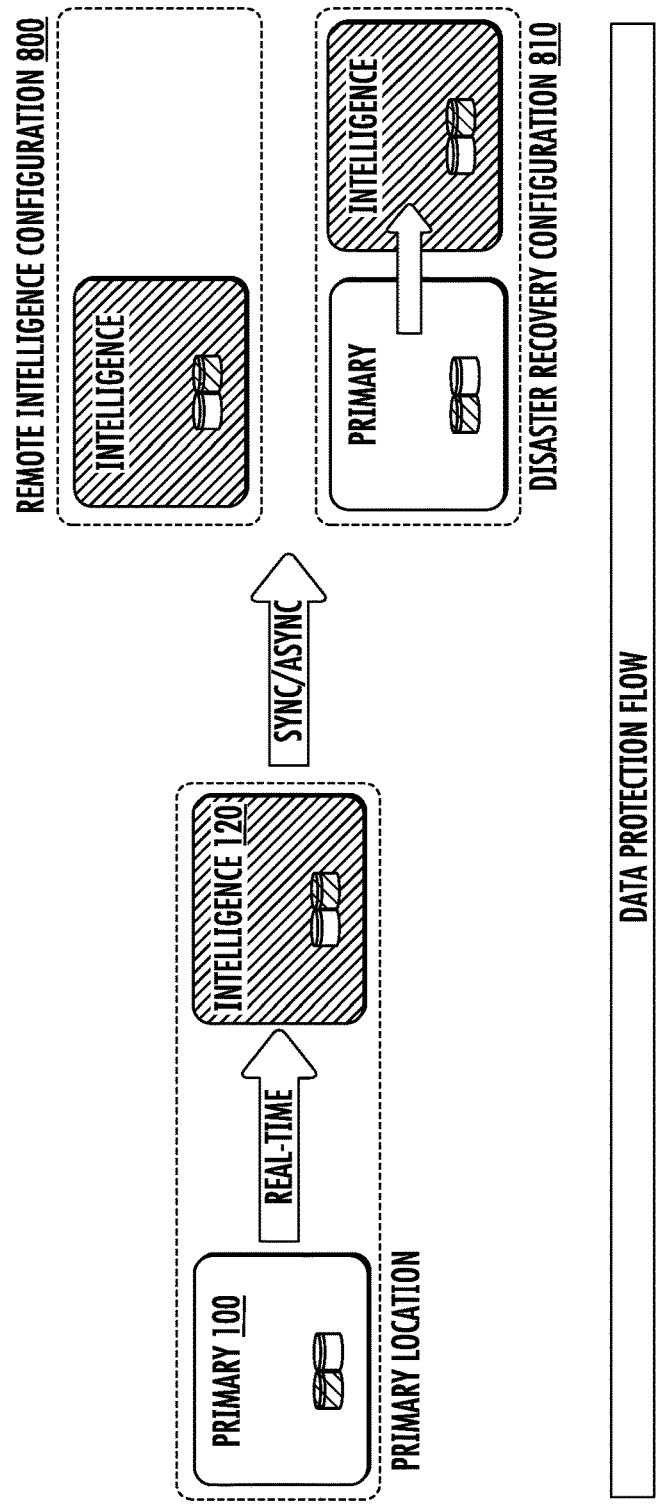
FIG. 8 is a diagram showing data protection flow from a Primary Node to an Intelligence Node to a Remote Site.

Referring also to FIG. 8, data protection flows between different nodes. Customers create data accessing Primary Node 100. Intelligence Node 120 protects customer data stored on Primary Node 100 by storing a mirrored copy of primary data within the intelligence pool 130. Previous versions of primary data can be retained within discovery points that are stored in the intelligence pool, further enhancing primary data protection. Each discovery point may include a crash consistent snapshot in time of customer data. Discovery points are created based on policies 520 associated with primary storage (file systems or volumes). Policies use fixed values (i.e. time passed or data change percentage) or previously gathered analytics as the main triggers for creating discovery points. If a Remote Site is connected, data may further flow from the Intelligence Node to the Remote Site, configured either for remote intelligence 800 or complete disaster recovery 810.

Figure 9:
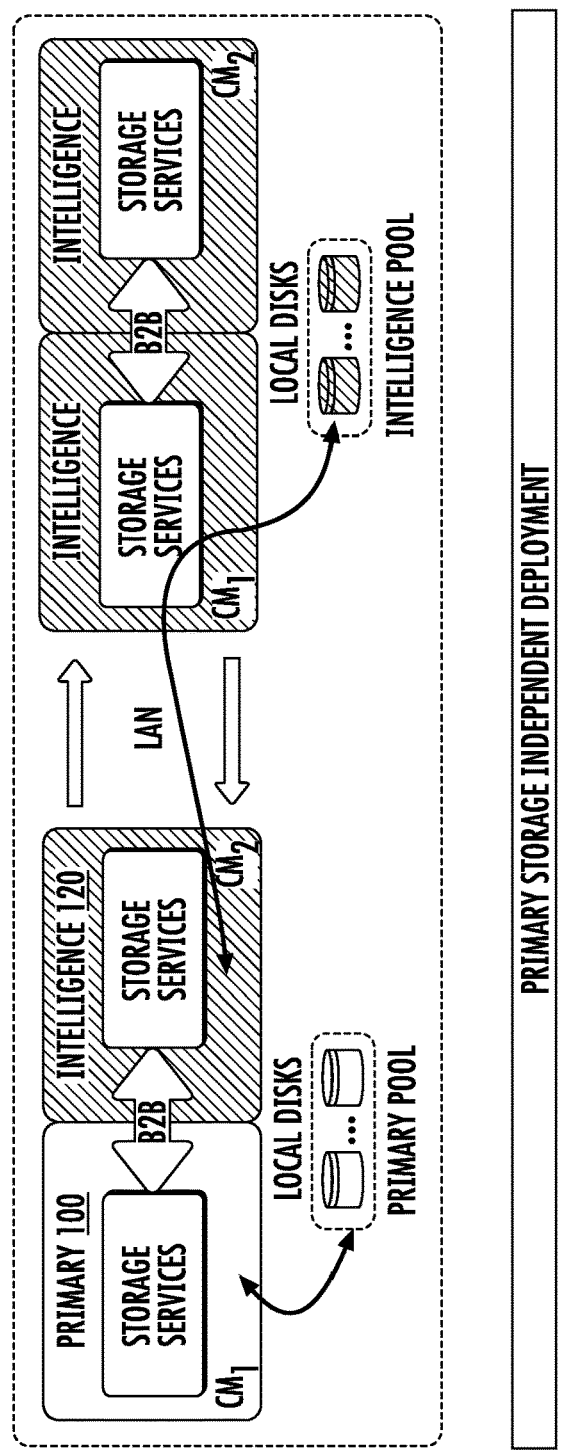
FIG. 9 is a diagram showing a Primary Node and an Intelligence Node in an independent deployment.
Figure 10:
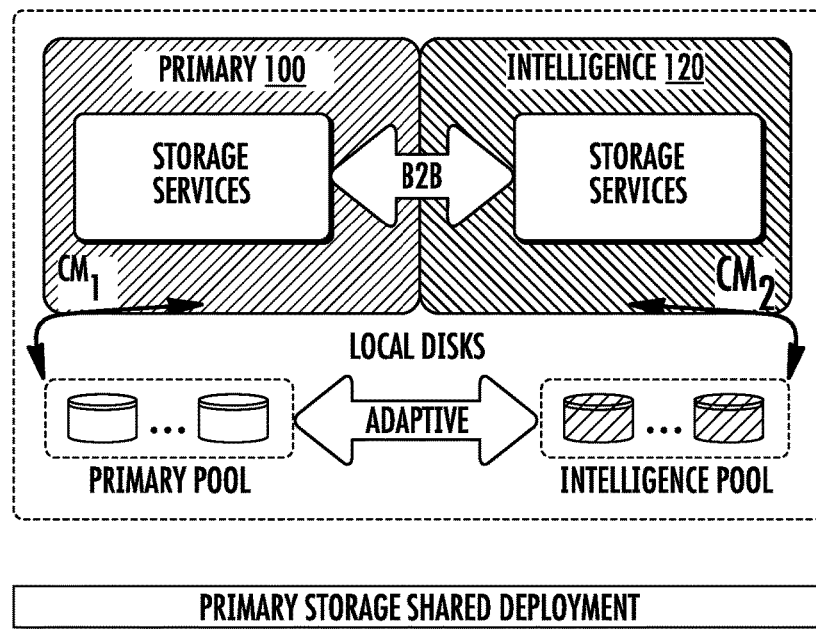
FIG. 10 is a diagram showing a Primary Node and an Intelligence Node in a shared deployment.

Primary and Intelligence Nodes can be deployed in an independent deployment or a shared deployment configuration, and both configurations can additionally be configured to communicate with a Remote Site. For both configurations users are presented with a single system management view. Referring also to FIG. 9, in an independent deployment Primary Node 100 and Intelligence Node 120 operate as independent separate appliances, with the Primary Node executing access requests to primary data independent of communications with the Intelligence Node. Referring also to FIG. 10, in the preferred shared deployment Primary Node 100 and Intelligence Node 120 are installed to be accessed and managed by users as if a single physical appliance, with the Primary Node confirming communications with the Intelligence Node on all data access requests. For both shared and independent deployments, in the case of failure of one of the nodes, the other node can continue to operate acting as both primary and intelligence nodes. When shared deployment is used the data protection from Primary to Intelligence Nodes is continuous; there is no data loss in the event of a Primary Node failure (full Node, or primary data pool) as HA stream data is delivered to the Intelligence Node in real time. When independent deployment is used the data protection from Primary to Intelligence Nodes may be real-time as in a shared configuration or alternatively near-continuous. In the near-continuous case, the HA stream data delivery to the Intelligence Node is delayed. This introduces a potential for some data loss in case of Primary Node failure (full Node, or primary data pool), but network latency has minimal impact on the primary 10 path performance. When independent deployment employs delayed data protection, change catalog entries are transferred in real time from Primary to Intelligence Nodes, but the mirror of primary data is delivered asynchronously creating the possibility of data loss. The change catalogs can be used to identify what changes were lost in the event of failure, by identifying received change catalog entries with no corresponding receipt of primary data.

Nodes deployed at a remote site can add an additional level of data protection, and communicate with the Intelligence Node. Remote Site deployment options are discussed below under Off-Site Data Protection, although they may also be deployed on-site as additional redundant protection.

Data Restore

Figure 11:
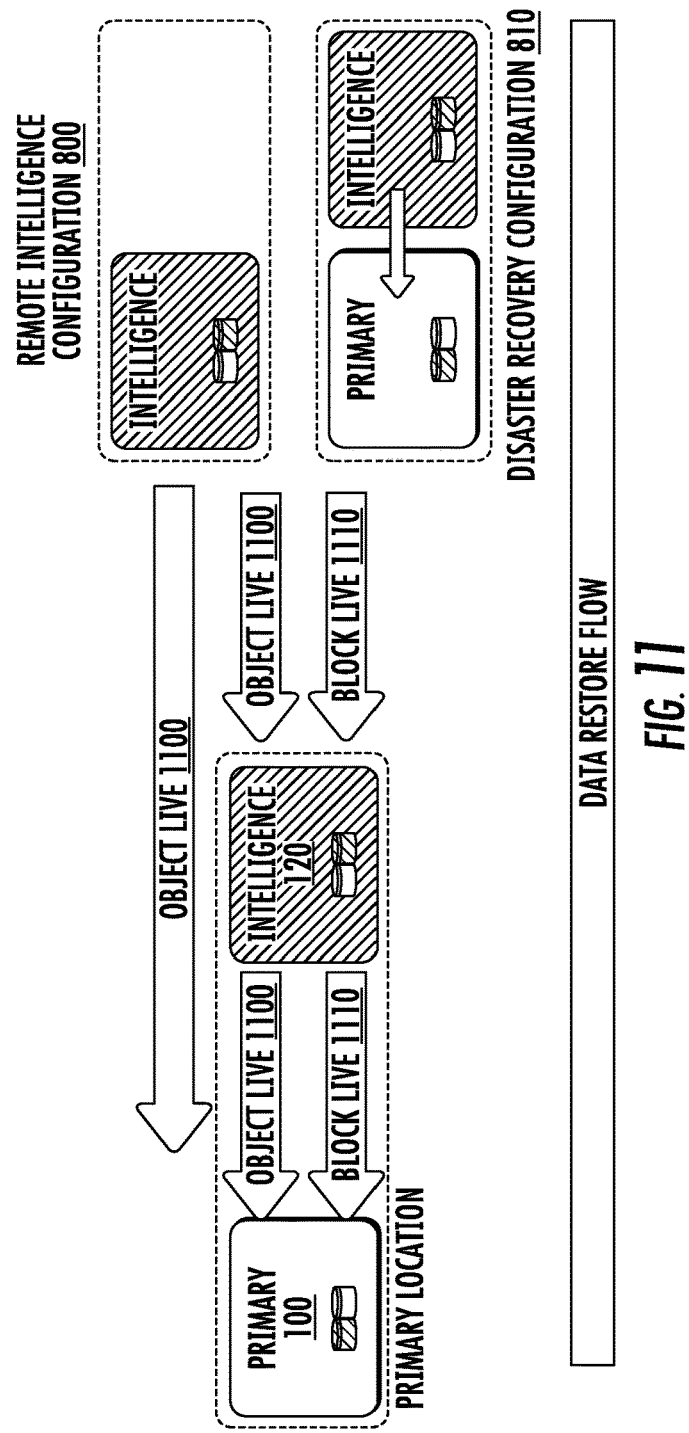
FIG. 11 is a diagram showing data restore flow from an Intelligence Node or Remote Site to a Primary Node, and from a Remote Site to an Intelligence Node.

Referring also to FIG. 11, data flows in the reverse direction during a restore process. Data restore may be selective (object-level) or full site. The restore is live, providing near instantaneous access to object level restored data, and significantly reduced wait time to access data from a full site restore when compared to traditional restore systems. The restore is fully protected, as any changes to restored data are tracked in real-time, even if the restore process is still on-going.

Current primary data is always protected by storing a mirrored copy of primary data in the intelligence pool 130. If primary data is retained in discovery points, users can restore previous versions of their data. Users use selective restores to restore data at file, directory or file system granularity using Object Live Restore 1100 either from Intelligence Node 120 to Primary Node 100, from Remote Site to Primary Node 100 in a remote intelligence configuration 800 or disaster recovery configuration 810, or from Remote Site to Intelligence Node 120 in either a remote intelligence configuration 800 or disaster recovery configuration 810. Full site restores utilize Block Live Restore 1110 to restore primary data from an Intelligence Node 120 to a Primary Node 100 or to restore both primary and intelligence data from a Remote Site in a disaster recovery configuration 810. A full site restore is most commonly needed in the event of a complete data pool failure. For restore flow consideration, current data (or current as of the selected discovery point to restore) is restored to the Primary Node, and discovery points (that include analytics metadata and primary data) are restored to the Intelligence node.

To perform a selective restore at an object level, a user selects a source discovery point 650 for the data restore. Selection may be direct if the specific discovery point is known, or based on results of a search on the analytics metadata associated with each discovery point. The searchable tags, content, classifications, etc. provide search access to, among other options, file type, file application metadata (for example document author), owner, analytics assigned tags (for example for files containing social security numbers), content search keywords, etc. Once the discovery point is chosen, a restore process starts. Data can be restored into the original container, overwriting the current version in primary storage, or into a different container thereby creating a separate copy.

The Object Live restore process, which operates to enable selective restore, is a core mechanism providing for rapid data restore at an object granularity. Users experience near-instantaneous access to the data when such restore is performed. To accomplish this, the node controlling the destination for the restore creates empty containers for what is being restored based on the metadata. Any actively requested portions are immediately sourced by requesting those specific portions from the restoring node. This creates immediately available data for end users. Any additional data needed to complete the restore is transferred with a priority assigned based on previously gathered over-time analytics. Such live restore and access is enabled by operation of PART intercepting all file access requests, enabling identification and prioritization of hot regions needing immediate restoration. Similarly, accesses and modifications to the restored file are tracked even while the background restore is ongoing, as these accesses are also intercepted by PART. Thus selective restore allows immediate access to restored objects and also real-time protection of any changes, even before the objects have been completely restored.

Figure 12:
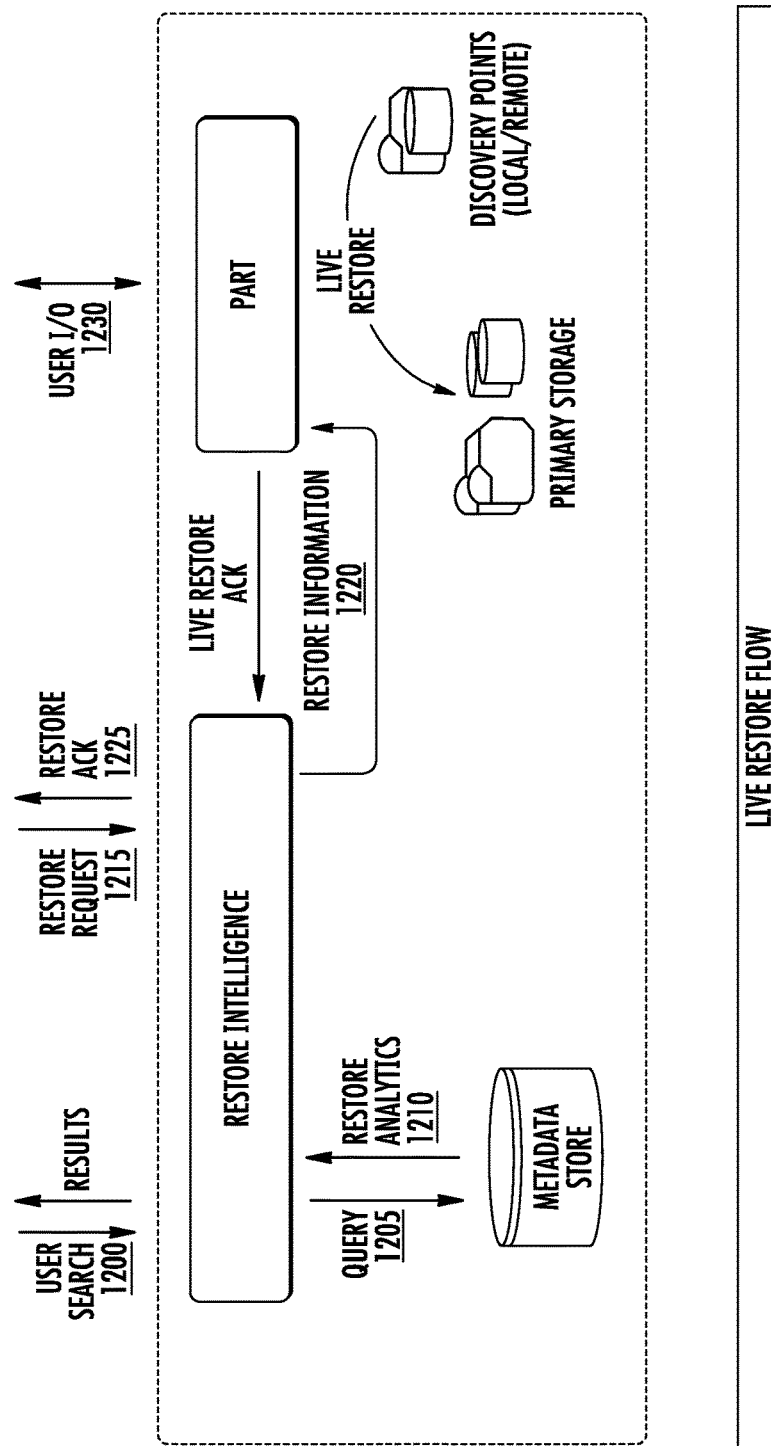
FIG. 12 is a diagram showing process flow for data restore.

Referring also to FIG. 12, with selective object restores the restore process appears complete to system users almost immediately after the restore request is made. Users search 1200 intelligence data, which internally queries 1205 metadata for restore analytics 1210, for a desired discovery point. Once identified, the user may initiate 1215 a restore request. The restore request, optionally along with related analytics metadata, is directed 1220 to the PART. The PART begins the restore by extracting metadata relevant to the restore from the discovery point. The file metadata includes file name, path, size, owner, group, and access rights information for each file, and specific to any point in time. With the metadata restored, the PART may provide file identification information, such as directory listings, without the actual restored data moving to primary storage. This allows acknowledgement 1225 to the user that the restore is complete, and operation 1230 of user input/output with the restored data, even before complete restore of the actual data. Actual restore of the data may be prioritized based on specific file access. For example, if specific file data not yet restored is accessed, that file may be prioritized for immediate restore. When no priority restores are occurring, general data restore of the entire data content may continue. In this fashion, users experience and may access immediate results from restore requests, even if the complete data restore requires a significant time period (such as minutes or hours).

A full site restore is used for bare-metal recovery, restoring chosen volumes and/or file systems, and associated discovery points and analytics data in bulk. With any full site restore the associated analytics metadata is also restored. There are two types of full site restores. A complete site restore restores both primary and intelligence data from a remote site. A primary-only site restore restores primary data from an Intelligence Node. To perform a full site restore, users identify one or more volumes and/or file systems and discovery point through direct selection or search and selection. Once file systems and associated discovery points are selected, the restore process starts. With a complete site restore, the version of the selected volumes and/or file systems in the selected discovery point are restored to Primary and Intelligence Nodes, and discovery points are restored to the Intelligence Node. With a primary-only site restore, the selected volumes and/or file systems in the selected discovery point are restored to the Primary Node. Additionally with a primary-only site restore, discovery points may be selected/de-selected for retention, with the Intelligence Node retaining all discovery points selected for retention and deleting the others.

The Block Live restore process, which enables full site restore, is a core mechanism that provides for rapid data restore at site granularity. Users experience dramatically reduced wait time before data is accessible after initiating a full site restore. As an initial step, metadata is copied, at a block storage level, for the volumes and/or file systems being restored. This copying creates the main delay time before data is accessible. The metadata identifies all objects being restored, both primary data and any discovery points. Once the metadata is restored, virtual containers can be created for all data entities being restored. At this point the primary data may be made available for user I/O access and normal operation. Actively accessed files or extents (regions) within volumes are immediately sourced and restored as block-level restores, creating priority restoration for actively accessed data. The remainder of the site data is restored as a background process using priorities based on previously gathered over-time analytics. As with selective restores, all accesses and modifications are tracked enabling real-time protection even while the background restore is ongoing. Such near-immediate access and real-time protection is enabled by PART intercepting all data access requests. Based on metadata, PART can identify if access requests are to already restored data, in which case operation continues as normal, or not-yet-restored data, in which case appropriate data blocks are identified for priority immediate restore.

System Management

A management service allows creating and modifying user rights, node and physical storage management, data intelligence configuration, manually creating and managing discovery points or scheduling options for automatic discovery point management, and provides access to the restore process. Different management software implementations are possible, but a preferred method is implementation of management software 320 as a management server within the Primary Node. The management server delivers user management through a browser-based interface to authorized administrators.

The management service allows management of discovery points. Discovery points may be manually created, scheduled for automatic creation based on time periods, or configured for dynamic automatic creation based on previously gathered over-time analytics. Archiving or migration to remote sites may also be triggered manually or scheduled for automatic occurrence based on time periods, or configured for dynamic automatic occurrence based on previously gathered over-time analytics.

The management service allows configuring the rule engine for data analytics. Such rules may be applied to all new data changes, or also run on all data already stored in a Intelligence Node. Rule priority may be set such that critical analysis is applied in-line at the Intelligence Node to make important analytics instantly available with all data, while less critical analysis may be batched and run periodically at lower priority.

In addition to a custom API available via traditional programming languages, the system supports a file access based interface allowing query creation, execution, control, and extraction of results through the standard file system API. Query execution files can be stored as special files in pre-identified locations. Such files may include information on queries to be performed, when to perform, resources to use to perform, where to place or store results, and what formats should be used to present the results (for example, raw data, pdf, a specific report format, etc.). When a query is being executed by the system, a progress folder may contain files with names and content that can be used to monitor progress. Users may write custom scripts and tools to create, schedule, monitor, and extract results using such standard file system operations.

Off-Site Data Protection

The Intelligence Node provides local protection to the primary data and analytics metadata. An optional remote system may provide further redundancy as well as an option for geographically remote protection of the primary data and analytics metadata.

In this discussion of such a solution, a primary location is considered to comprise Primary and Intelligence Nodes as described earlier, and the Intelligence Node communicates with a Remote Site system.

As with discovery points, with remote protection analytics metadata is associated and transferred with the actual data (both for protection and restore). Remote Sites may be configured to receive and store mirrors of Intelligence Node, thereby providing geographically separate redundancy, or as an archival option. Data changes (a delta of data and analytics) are sent from the Intelligence Node to the Remote Site, enabling a redundant copy of primary storage and current analytics, with options to configure different rules for discovery point creation enabling different archival options at the Remote Site. For archival purposes, rules may be configured such that the local Intelligence Node retains discovery points within a specified time period and frequency, and the Remote Site contains a different set, such as spanning a longer time period and/or lower frequency. For example, the Intelligence Node may be configured to retain hourly discovery points for the past thirty days, while the Remote Site may be configured to retain daily discovery points for the past two years. Global analytics are available across the data for the entire time period based on the metadata retained at both nodes. Remote Site rules may further be configured at different levels, such as at the system or user share or internal file system levels, allowing different degrees and duration of protection within a larger data set.

Such off-site data protection provides two possible solutions: Disaster Recovery (DR) and Remote Intelligence. Both solutions provide protection of customer data and analytics metadata in case of a full primary location failure (both Primary and Intelligence failure on the primary location). The Primary to Intelligence to Remote Site data flow extends data protection to an additional level.

Remote Intelligence

As shown in FIG. 1, when operating normally with a Remote Intelligence configuration, the local site Intelligence Node replicates data and analytics metadata to Remote Site Intelligence Node 140. The Remote Intelligence Node may be configured to receive discovery point data and analytics replicated from the Intelligence Node, such as discovery points about to be aged off (deleted from) the Intelligence node, or to receive copies of live change data and create the discovery points and related analytics directly at the Remote Intelligence Node. Discovery points on the Remote Intelligence Node may be aged out (deleted) and analytics metadata pruned based on configured policies operated by the Rule Engine of the Remote Intelligence Node.

Data replication to a Remote Site may be done synchronously or asynchronously. In the synchronous case, data is replicated in real-time and the Remote Site contains a complete and up-to date copy of primary storage data. The advantage of such synchronous method is that no data is lost in case of a complete failure (both primary and intelligence) at the local site. However, local site performance can be significantly reduced because data must be replicated to the Remote Site before a storage operation is acknowledged as completed.

The asynchronous case avoids the risk of performance impact on primary storage. Data replication may be delayed, in which case the Remote Site contains a version of primary storage data, but not up-to-date in real time. This avoids any performance impact, but introduces a risk of some data loss in case of complete failure of the local site (both Primary and Intelligence Node failure).

Object Live Restores can be performed for any discovery points on the local or remote Intelligence Nodes. To an end user perspective, there is no distinction in recovery data between a local or remote Intelligence Node—all discovery points on both Intelligence Nodes are searchable and available for use in recovery through management interfaces provides by the Primary Node.

In case of a complete local site system failure, the local site may be restored from the Remote Site, allowing full operation as part of a full site restore process. Prior to restoration of the local site, users can perform searches using the analytics metadata available at the Remote Intelligence Node. Users may have read-only access to data stored within each discovery point on the Remote Intelligence Node, or read-write access to their data stored within each discovery point, depending upon policy configuration. However, in the read-write case newly modified data might be not protected. Based on the chosen policy and Remote Intelligence Node system capabilities, no, limited, or complete analytics may be produced on the newly modified data. In one example, only a change catalog is maintained for the newly modified data and no queries could be performed on the newly modified data. In another example, full analytics metadata is produced but possible with much less performance. For full operation utilizing the remote site after a local site failure, the disaster recovery configuration is preferred.

Disaster Recovery

Figure 13:
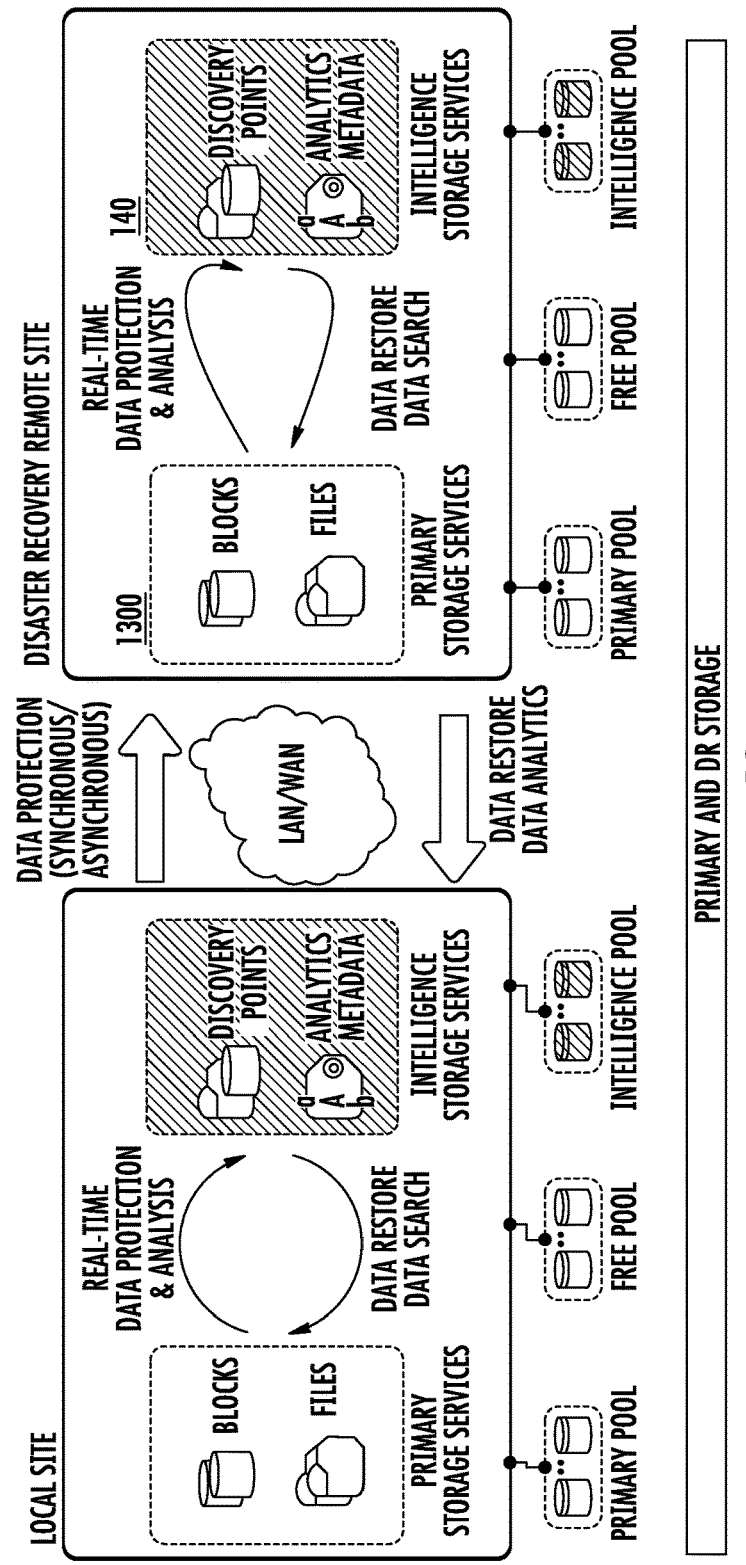
FIG. 13 is a diagram showing FIG. 1 modified to replace the Remote Intelligence Node with a disaster recovery configuration of a Remote Primary Node and Remote Intelligence Node.

Referring also to FIG. 13, a Disaster Recovery solution may be implemented by deploying at a remote site both Remote Intelligence Node 140 and Remote Primary Node 1300, extending functionality beyond that discussed under Remote Intelligence. In case of a local site complete failure, an automatic or manual failover could be initiated. The failover transfers primary operation from the local site to the remote site, allowing local users to continue operating with primary storage being provided from the remote site. When the local location is recovered (metadata restored to the local nodes), a manual or automatic failback may be initiated. The failback process transfers primary storage operations from the remote site to the local site. Any data and analytics changes made while using the remote site for primary storage are synchronized back to the local site nodes.

Such disaster recovery configurations may be applied to multiple sites by allowing multi-tenancy within nodes. For example, a single remote site may be configured to operate as the remote site for multiple primary local sites. On failure of any one primary site, that site transfers to using the remote site for primary storage until the local site is restored, while the other local sites continue to operate as primary storage sites while using the remote site for disaster recovery. With such configuration, the storage and processing required at the remote site is greater than at any local site. As an alternative, two separate local sites may use each other for disaster recovery. For example, local system A may use remote system B as its disaster recovery. Yet remote system B may also operate as local system B for a different set of users, and use system A for remote system disaster recovery. In alternative configurations, a local site may utilize multiple remote sites for disaster recovery, building additional degrees of redundancy, or remote sites may be deployed as partial recovery solutions, such as only implementing a Primary Node for primary node redundancy but no protection of intelligence node discovery points and analytics.

Distributed Intelligence

With both Remote Intelligence and Disaster Recovery configurations, different options for operation are possible with respect to analytics. While data changes must be replicated to the remote site, a replication policy can control what is done with the analytics metadata. In a preferred embodiment, changes in analytics data are also replicated to the remote site. However, different configurations are possible including distribution of analytics processing. For example, to reduce the amount of data exchanged some of the analytics metadata produced at the local site may be replicated to the Remote Site, and some of the analytics metadata may be produced by the Remote Intelligence Node processing the replicated data. Different rules may be applied in the rule engines such that the analytics generated at the Remote Intelligence Node may repeat, perform different analytics, or perform none of the analytics performed at the Intelligence Node. A decision to replicate analytics metadata at the remote location may be based on the size of the analytics metadata and the complexity of the metadata production process, such as measured in CPU cycles and/or storage operations (I/O calls). Intelligence may also be distributed based on priorities or load, with different analytics run at the local and remote Intelligence Nodes and then distributed back between nodes.

With both configurations, customers have full real-time access to their discovery points (analytics metadata independent and primary data) independent of whether their data and analytics metadata is stored on a local or remote Intelligence Node. This access is provided via the Primary Node, with no difference as to if any Remote Intelligence Node is in operation. Search and restore operations may span both the local and remote Intelligence Nodes.

Cumulative analytics metadata for all discovery points on local and remote Intelligence Nodes may be kept at either or both of the local and remote Intelligence Nodes, or only metadata applicable to the data stored on the respective nodes. Factors in deciding to retain the remote metadata at the local Intelligence node may be based on time to access the metadata locally or remotely, cost of performing the search within one or across multiple local and remote discovery points, and maintenance of cumulative analytics metadata.

Physical Storage Devices

The preferred embodiment includes dedicated disk storage devices connected to both the Primary and Intelligence Nodes. This provides multiple benefits. Physical storage may be dynamically allocated between primary storage, intelligence and data protection storage to account for changing needs on the system. Additionally, in case of failure of one node the other node may operate as both nodes and access disks allocated to each node. The allocation may be configured by an administrator or dynamically by the Primary Node based on observed system storage analytics. Even with connection to all physical storage devices, as a reliability measure no single physical storage device (single disk or spindle) is allocated to store both Primary and Intelligence data. If both primary and intelligence data are stored on a single storage device, and that device fails, redundancy is lost and the failure could lead to simultaneous data loss of both Primary and Intelligence.

In addition to direct physical connection, networked storage devices may be allocated between Primary and Intelligence Node use. Thus expansion may be dynamically allocated between Primary and Intelligence Node use, and existing physical devices may be dynamically re-allocated based on changing use.

Figure 14:
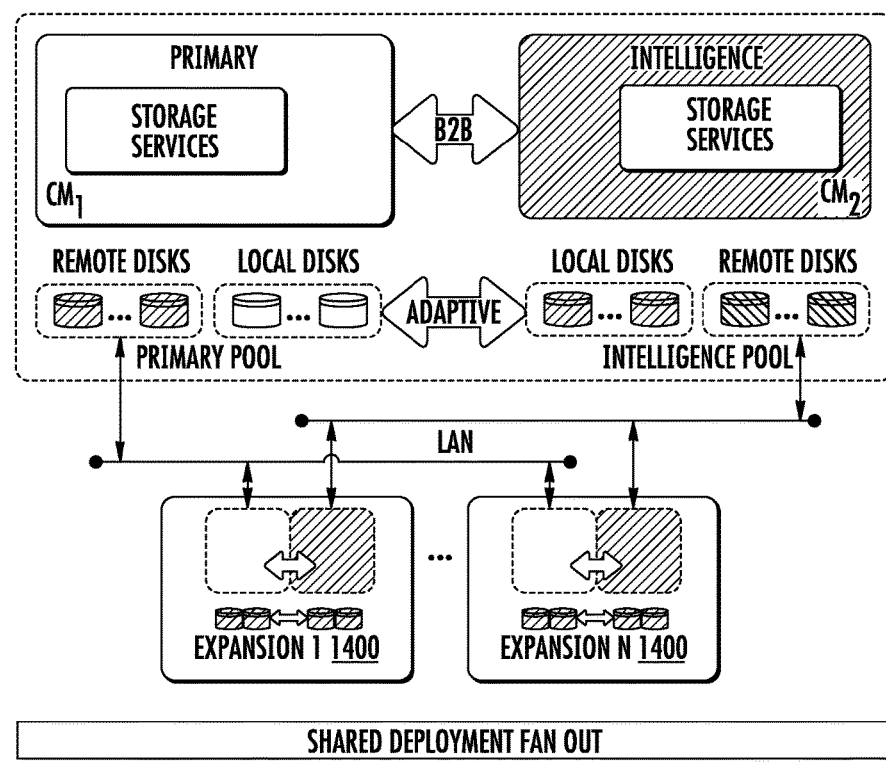
FIG. 14 is a diagram showing fan-out expansion of storage pools connected to a shared deployment.
Figure 15:
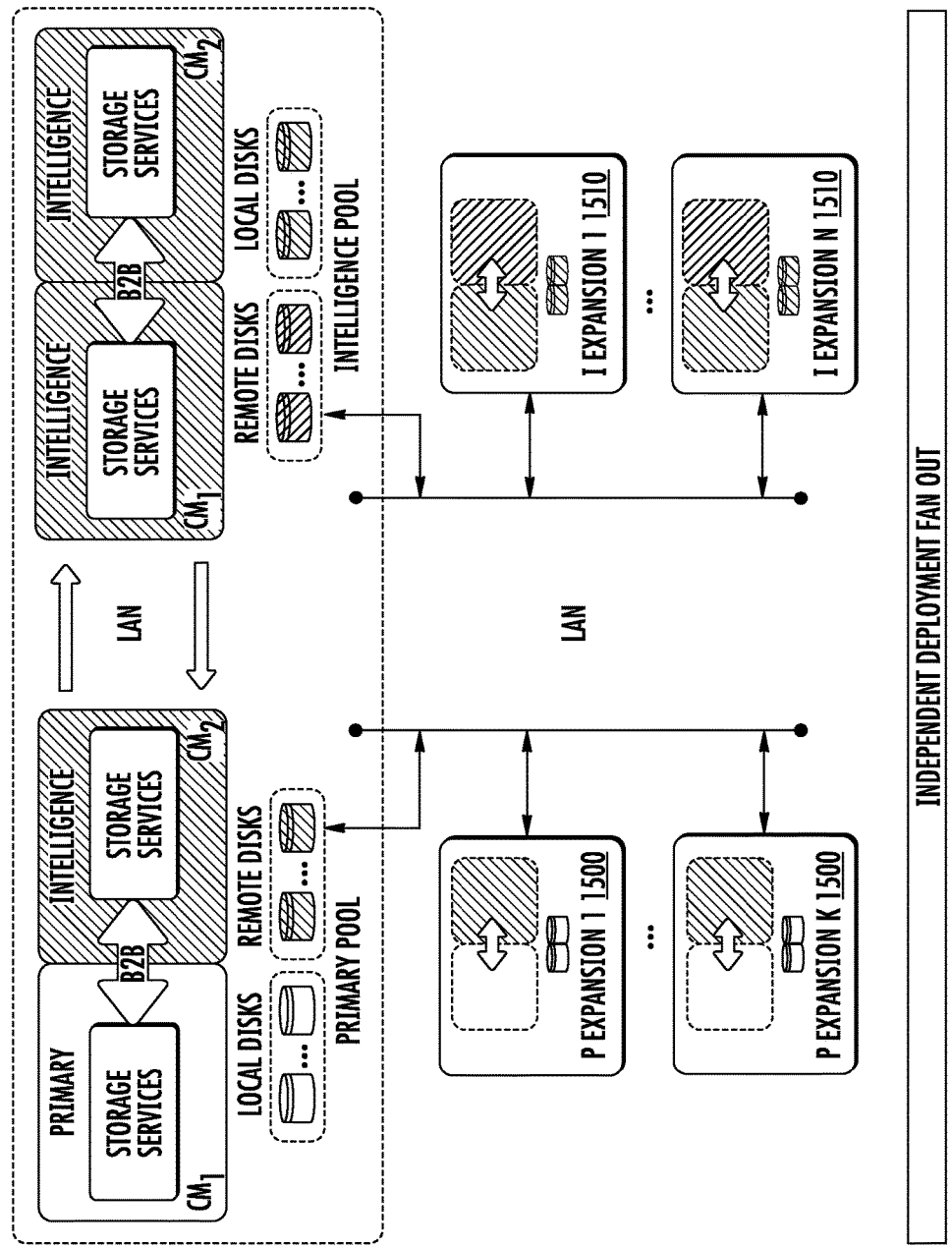
FIG. 15 is a diagram showing fan-out expansion of storage pools connected to an independent deployment.

Referring also to FIGS. 14 and 15, fan-out is a mechanism that allows the capacity and computational capacity of the system to grow as additional data needs to be stored, backed up and analyzed. The access methods and core file system are connected to a "head node" while additional nodes are attached as expansion nodes via the network, expanding data pools in both shared and independent deployments. In shared deployment, expansion nodes 1400 may be utilized for either or both of primary or intelligence expansion, while in independent deployment expansion nodes are dedicated as primary expansion nodes 1500 or intelligence expansion nodes 1510. These expansion nodes allows increasing capacity for handling the growth of primary and intelligence data pools with sufficient processing and storage capabilities. This also allows increasing computational capabilities for handling the growth or analytics metadata and analytics related processing. Expansion nodes must implement a communication protocol to enable operation with a head node, and contain physical resources of processor and/or storage capacity which may be utilized to increase the resources accessed through the head node. While a main need is to expand storage capacity, additional processors may be utilized through distributed analytics processing to increase computational power of the system.

In addition to traditional rotating platter hard disk drives (HDDs), other physical storage devices may be used. Slow access devices, such as tape, are generally too slow to be viable as devices used with primary storage but may be connected for use for archival purposes. Faster access devices such as solid state drives (SSDs) may also be used. To balance performance, capacity, and cost, in the preferred embodiment HDDs are used for user data storage including primary storage, and SSDs are used for storing intelligence and/or analytics data. Furthermore, use of NVRAM can increase reliability and performance of the system when accessing primary, data protection, data analytics and performing searches. This provides faster access to intelligence data enabling rapid search.

In the preferred embodiment, change catalogs (the analytics metadata) are stored within a database on fast access devices such as SSDs. This allows rapid searching of stored data through searching the metadata database.

System Data Flow

Figure 16:
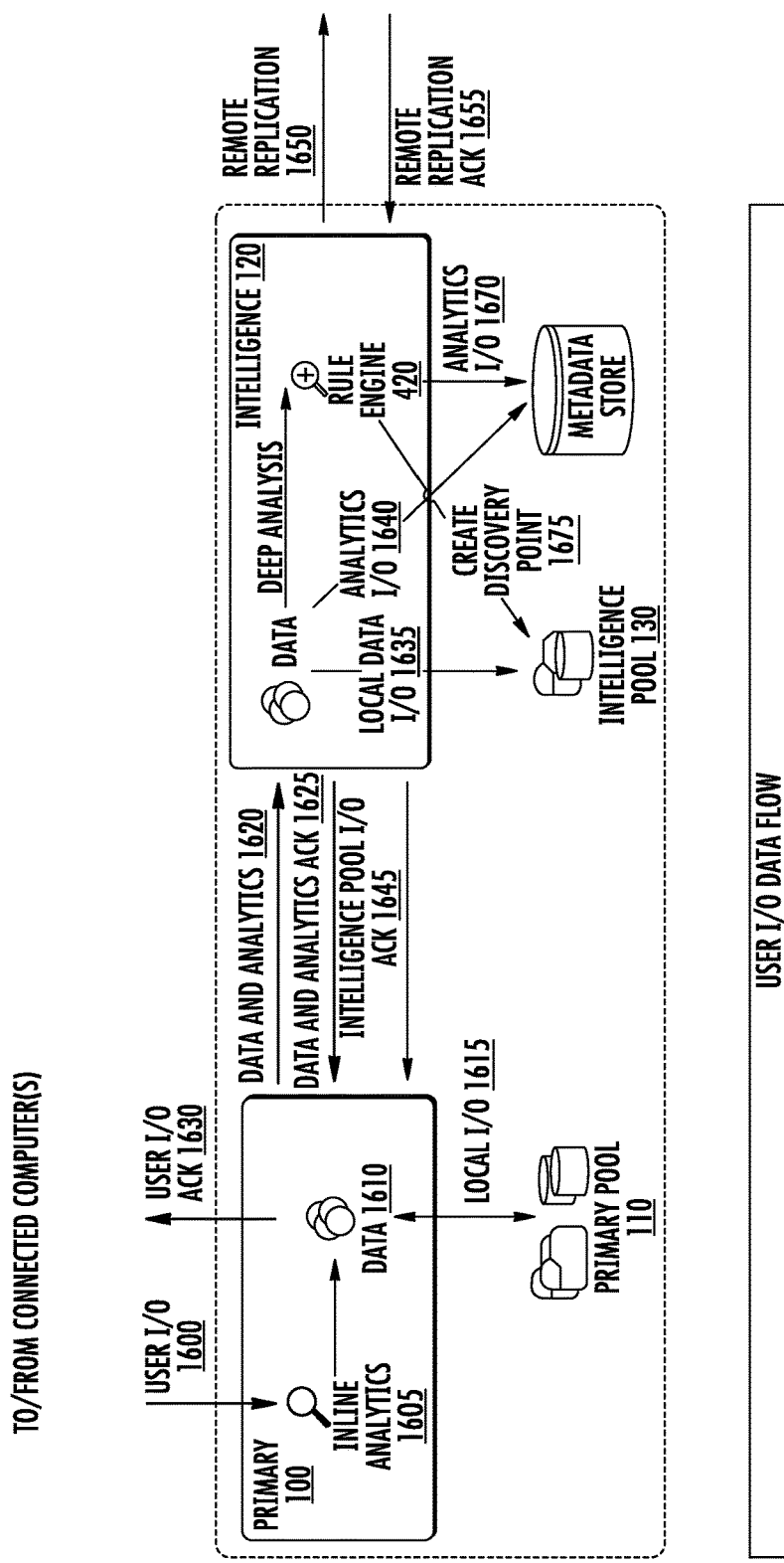
FIG. 16 is a diagram showing process flow on a user data access command.

Referring also to FIG. 16, a typical user data access request is illustrated in flow across a preferred, shared deployment embodiment of the entire system. The access request 1600 is received by the Primary Node 100 from one of the connected computers(s), and is first processed through real-time inline analytics 1605. For read requests, the requested data 1610 may be immediately retrieved 1615 from physical storage in the primary pool 110 and returned 1630 to the user. Analytics, but not any user data, is transferred 1620 to the Intelligence Node 120. Acknowledgment from the Intelligence Node is not required before returning requested data to the user, as no user data is transferred to the Intelligence Node. For write requests, the analytics and data are mirrored 1620 to the Intelligence Node, and acknowledgement received 1625 from the Intelligence Node before further processing. This ensures real-time protection of the data. After receiving acknowledgment from the Intelligence Node, acknowledgment may be returned 1630 to the user request and the data written to physical storage devices. At the Intelligence Node 120, after acknowledging receipt 1625 the data is written 1635 to physical storage 130, thereby maintaining a real-time copy of primary data. Received analytics are also written 1640 to physical storage, and the data change is recorded in a currently open discovery point. A separate acknowledgment may be returned 1645 to the Primary Node confirming the completion to Intelligence Pool 130 I/O. If a Remote Site is configured, data and analytics are replicated 1650 to the Remote Site, with acknowledgement returned 1655 to the Intelligence Node to confirm receipt. The Rule Engine 420 may further analyze the data and changes for deep analytics, and store 1670 the results to disk. Based on rules and scheduling, the Rule Engine analysis may occur at any point after the data reaches the Intelligence Node. The Rule Engine may also determine when a new discovery point should be created 1675, or if older discovery points should be deleted or transferred to a remote location.

Discovery Point Structure

Figure 17:
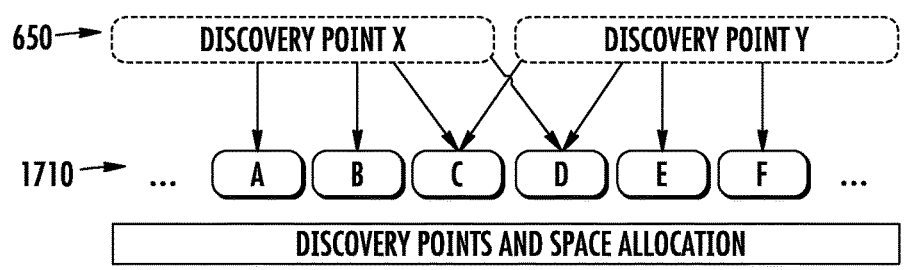
FIG. 17 is a logical view of discovery points.

Referring also to FIG. 17, each discovery point 650 provides a direct access to the entire data set at the time the discovery point was created and processed, and includes both primary data and analytics metadata as was described in connection with FIG. 6B. A discovery point thus references individual chunks 1710 of primary data directly. Each chunk of data may be referenced by multiple discovery points as well as by the mirrored copy of primary data. When a new discovery point is created, new data that represents differences (in primary data and analytics metadata) from the previous discovery point is stored by the system and referenced by the newly created discovery point. The newly created discovery point also references the chunks of data that have not been modified since the previous discovery point. Each data chunk is retained by the system as long there is at least one discovery point and/or mirrored copy of primary data referencing it, and deleted when the last reference is deleted. The example shown in FIG. 17 displays two discovery points X and Y and chunks of data they reference. Discovery point X references chunks A, B, C and D directly, and discovery point Y references chunks C, D, E and F directly. If discovery point X is deleted, chunks A and B are also deleted, however chunks C and D are retained as discovery point Y also references those chunks. If instead discovery point Y is deleted, chunks E and F are also deleted but Chunks C and D are retained as still referenced by discovery point X.

Other Embodiments

In an optional embodiment, a separate appliance may enable deeper analytics on the existing data and metadata. This additional appliance may use the same spindles as the intelligence data pool, or provide separate local storage to limit impact on the primary system. Such appliance may be preferred for situations requiring custom tailored (user and application specific) analytics processing.

In another optional embodiment, primary storage may be extended to apply intelligence analytics to other storage types, such as object storage or content addressable storage. Such an embodiment may also export SQL and or other types of structured data to access other APIs, such as, for example, participating in a Hadoop environment or other Big Data applications or environments. Application-specific uses might include, but are not limited to, Sales, CRM, or social media data. In addition to application to different types of storage, the system may be accessed by different types of search. For example, search and recovery may be integrated into standard desktop search tools, or customized third party applications.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for handling data, the method executed by one or more programmable data processors, the method comprising:

receiving a data access request that includes request data;
performing in-line analytics on the data access request and the request data;
storing at least one of the in-line analytics, data access request, or request data in a storage pool;
performing additional analytics on at least one of the data access request, request data, or in-line analytics to provide extended metadata; and
if a subsequent access request includes changes to the request data, storing a discovery point in the storage pool, the discovery point including a change entry and the extended metadata,
wherein the storing of the discovery point occurs at a point in time determined by a weighted percentage change factor that depends on attributes of the changes to the request data, and wherein the percentage change factor is weighted by a weighting factor that reflects an importance of the request data, thereby minimizing the storage of discovery points with unimportant data.

2. The method of claim 1 wherein the change entry in the discovery point includes at least one of an identifier for the changes to the request data, an identity of a user who initiated either the data access request or the subsequent access request, or a time of the subsequent access request.

3. The method of claim 1 wherein the discovery point further stores both the request data in the data access request and the changes in the request data.

4. The method of claim 1 wherein the weighted percentage change factor depends on an identity of a user who initiated at least one of the data access request or the subsequent access request.

5. The method of claim 1 wherein the weighted percentage change factor depends on one or more attributes of a file specified in the data access request, and wherein the attribute is at least one of a directory, file type, or file owner.

6. The method of claim 1 wherein the weighted percentage change factor depends on a relative importance of the data related to the data access request.

7. The method of claim 1 wherein the weighted percentage change factor is further dependent upon percentage change of certain identifiable subsets of the storage pool.

8. The method of claim 1 wherein the weighted percentage change factor is further dependent upon detected deviations from usage patterns indicating an increase in frequency of specific accesses.

9. The method of claim 1 wherein the weighted percentage change factor is further dependent upon a location of one or more files which contain or relate to the data access request.

10. The method of claim 1 wherein the weighted percentage change factor is further dependent upon an identity of an application that originated the data access request.

11. The method of claim 1 wherein the data access request is received from a primary node, and the extended metadata is stored in an intelligence node.

12. The method of claim 11 wherein the primary node and intelligence node are co-located.

13. The method of claim 11 wherein the primary node and intelligence node are located remotely from one another.

14. The method of claim 11 wherein a single processing node implements the primary node and intelligence node, and the intelligence node executes when the single processing node is not occupied with functions of the primary node.

15. The method of claim 1 wherein the extended metadata includes one or more of:

extended information concerning the data access request;
an identification of who initiated the data access request;

how many modifications have occurred;
an aggregate size of the modifications;
a data object owner;
an access control list; or
a time of the data access request.

* * * * *